(12) United States Patent
Tanaka et al.

(10) Patent No.: US 10,040,508 B2
(45) Date of Patent: Aug. 7, 2018

(54) MOTOR DRIVING CONTROL APPARATUS

(71) Applicants: MICROSPACE CORPORATION, Tokyo (JP); TAIYO YUDEN CO., LTD., Tokyo (JP)

(72) Inventors: Masato Tanaka, Tokyo (JP); Yasuo Hosaka, Tokyo (JP); Kazuo Asanuma, Tokyo (JP); Hiromi Hagiwara, Tokyo (JP); Satoru Shimizu, Tokyo (JP)

(73) Assignees: MICROSPACE CORPORATION, Tokyo (JP); TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/596,310

(22) Filed: May 16, 2017

(65) Prior Publication Data

US 2017/0247079 A1    Aug. 31, 2017

Related U.S. Application Data

(63) Continuation of application No. 14/897,014, filed as application No. PCT/JP2014/065682 on Jun. 13, 2014, now Pat. No. 9,896,153.

(30) Foreign Application Priority Data

Jun. 14, 2013  (JP) .................. 2013-125452

(51) Int. Cl.
*B62M 6/45*    (2010.01)
*B62M 6/50*    (2010.01)
(Continued)

(52) U.S. Cl.
CPC ............. *B62M 6/45* (2013.01); *B60L 7/10* (2013.01); *B60L 7/12* (2013.01); *B62M 1/36* (2013.01);
(Continued)

(58) Field of Classification Search
CPC .... B60L 2200/12; B60L 2220/16; B60L 7/10; B60L 7/12; B62M 1/36; B62M 23/02; B62M 6/50; B62M 6/90
(Continued)

(56) References Cited

U.S. PATENT DOCUMENTS 5,457,363 A     10/1995  Yoshii
6,381,522 B1 *   4/2002  Watanabe ............... B60K 6/48
                                                    180/65.25
(Continued)

FOREIGN PATENT DOCUMENTS

CN    1647968 A    8/2005
CN    102348597    2/2012
(Continued)

OTHER PUBLICATIONS

U.S. Appl. No. 14/897,014, filed Dec. 9, 2015, Masato Tanaka, et al., Microspace Corporation and Taiyo Yuden Co., Ltd.
(Continued)

*Primary Examiner* — Tyler J Lee
(74) *Attorney, Agent, or Firm* — Staas & Halsey LLP

(57) ABSTRACT

This motor driving control apparatus includes (A) a driving unit that drives a motor, and (B) a regeneration control unit that controls the driving unit so as to generate a regenerative braking force in accordance with a vehicle acceleration, a vehicle speed and a pedal-rotation converted speed that is obtained from a pedal rotation.

8 Claims, 15 Drawing Sheets

(51) Int. Cl.
  *B62M 23/02* (2010.01)
  *B60L 7/12* (2006.01)
  *B60L 7/10* (2006.01)
  *B62M 1/36* (2013.01)
  *B62M 6/90* (2010.01)

(52) U.S. Cl.
  CPC ............... *B62M 6/50* (2013.01); *B62M 6/90* (2013.01); *B62M 23/02* (2013.01); *B60L 2200/12* (2013.01); *B60L 2220/16* (2013.01)

(58) Field of Classification Search
  USPC .......................................................... 701/22
  See application file for complete search history.

(56) References Cited

U.S. PATENT DOCUMENTS

| | | | | |
|---|---|---|---|---|
| 6,439,674 | B1* | 8/2002 | Niino | B60L 7/003 180/165 |
| 7,167,783 | B2 | 1/2007 | Park et al. | |
| 8,608,255 | B2* | 12/2013 | Shimada | B60K 6/44 303/10 |
| 2002/0079853 | A1* | 6/2002 | Schmitz | B60L 3/0046 318/434 |
| 2004/0210356 | A1* | 10/2004 | Wilton | B60L 3/0046 701/22 |
| 2005/0263333 | A1* | 12/2005 | Fujiki | B60K 6/48 180/65.25 |
| 2006/0220453 | A1* | 10/2006 | Saito | B60L 7/26 303/152 |
| 2007/0187161 | A1* | 8/2007 | Kiuchi | B60K 6/48 180/65.29 |
| 2007/0251741 | A1* | 11/2007 | Kidston | B60L 11/14 180/65.29 |
| 2009/0112386 | A1 | 4/2009 | Saitoh | |
| 2012/0081080 | A1* | 4/2012 | Aoki | B62M 6/45 320/137 |
| 2012/0083954 | A1* | 4/2012 | Aoki | B62M 6/45 701/22 |
| 2012/0083956 | A1* | 4/2012 | Aoki | B62M 6/45 701/22 |
| 2012/0083957 | A1* | 4/2012 | Aoki | B62M 3/003 701/22 |
| 2012/0109441 | A1* | 5/2012 | Vespasien | B60L 7/18 701/22 |
| 2013/0015860 | A1* | 1/2013 | Crombez | G01R 31/36 324/433 |
| 2014/0039741 | A1 | 2/2014 | Tanaka et al. | |
| 2014/0039742 | A1 | 2/2014 | Tanaka et al. | |
| 2014/0114514 | A1* | 4/2014 | Crombez | B60W 10/06 701/22 |
| 2015/0006001 | A1* | 1/2015 | Kawata | B60K 6/48 701/22 |

FOREIGN PATENT DOCUMENTS

| | | |
|---|---|---|
| EP | 0 798 204 A1 | 10/1997 |
| EP | 0976649 | 2/2000 |
| EP | 1 886 913 A2 | 2/2008 |
| EP | 1886913 | 2/2008 |
| EP | 2218635 | 8/2010 |
| EP | 2 617 636 A1 | 7/2013 |
| JP | 8-140212 | 5/1996 |
| JP | 9-76983 | 3/1997 |
| JP | 9-267790 | 10/1997 |
| JP | 2000-6878 | 1/2000 |
| JP | 2002-145168 | 5/2002 |
| JP | 2002145168 | 5/2002 |
| JP | 2003-204602 | 7/2003 |
| JP | 2008-44414 | 2/2008 |
| JP | 2010-35376 | 2/2010 |
| JP | 4608764 | 10/2010 |
| WO | 2010/092345 | 8/2010 |
| WO | WO 2012/035682 | 3/2012 |
| WO | 2012/086459 | 6/2012 |
| WO | WO 2012/086458 | 6/2012 |
| WO | WO 2012/086459 A1 | 6/2012 |

OTHER PUBLICATIONS

International Search Report dated Aug. 26, 2014, in corresponding International Application No. PCT/JP2014/065682.
International Preliminary Report on Patentability dated Dec. 15, 2015 in corresponding International Patent Application No. PCT/JP2014/065682.
Chinese Office Action dated Nov. 2, 2016 in corresponding Chinese Patent Application No. 201480033782.7.
U.S. Notice of Allowance dated Mar. 1, 2017 in U.S. Appl. No. 14/897,014.
U.S. Office Action dated Oct. 5, 2016 in U.S. Appl. No. 14/897,014.
Taiwan Office Action dated Dec. 1, 2016 in Taiwan Patent Application No. 10521488100.
Extended European Search Report dated Jun. 1, 2017 in European Patent Application No. 14811665.0.
U.S. Notice of Allowance dated Oct. 19, 2017 in U.S. Appl. No. 14/897,014.

* cited by examiner

MOTOR DRIVING CONTROL APPARATUS

CROSS-REFERENCE TO RELATED APPLICATIONS

This application is a Divisional of Ser. No. 14/897,014, filed Dec. 9, 2015, which is a U.S. National Stage application, which claims the benefit under 35 U.S.C. 371 of PCT International Application No. PCT/JP2014/065682, filed Jun. 13, 2014, which claims the foreign priority benefit under 35 U.S.C. 119 of Japanese Patent Application No. 2013-125452, filed on Jun. 14, 2013, the contents of which are incorporated herein by reference.

TECHNICAL FIELD

This invention relates to a motor drive control apparatus for an electrically assisted vehicle such as a bicycle with a motor.

BACKGROUND TECHNOLOGY

Some electrically assisted vehicles that control driving force of a vehicle by driving a motor using an electric power of a battery use a technique for extending an assisted running distance by providing a sensor for a brake lever and causing the motor to perform regeneration when detecting, by the sensor, a brake operation by a rider to collect kinetic energy of the vehicle to the battery.

More specifically, there is a technique for making a regeneration amount in case where only the brake operation of either of brake levers is made less than a regeneration amount in case where the brake operations of both brake levers are made. With this technique, it is possible to select either of a larger regenerative braking force and a smaller regenerative braking force by the brake operation or operations with a simple configuration and a low cost, however, the rider has to determine the timing when the regeneration is performed. In addition, the relatively large regenerative braking force is set because of the consistency with the fact that the rider intentionally performed the brake operation. Therefore, the regenerative braking operation of this technique runs off the optimum regenerative braking operation, which corresponds to the running state, an energy amount obtained by the regeneration decreases, and it is impossible to extend the running distance.

Moreover, there is also a technique for changing an effect of the regenerative braking according to an operation amount of the brake. In this technique, the control is performed so as to obtain a regeneration amount according to a vehicle speed, in other words, a larger regeneration amount on a lower speed side. Then, in the running state such as the running in the urban in which the brake operations are frequently performed and the sudden brake operation is easily made, the large regenerative braking force is made and it is possible to frequently charge the battery by the electric current obtained by the regeneration. In addition, it is disclosed that both of the comfortable running and change of the battery can also be performed by the regenerative braking without any brake operation when running on a downhill road. However, in the control that the running on the downhill road is simply determined and the regeneration is performed when no pedal torque exists, too large regenerative braking force is made in a state where the running is performed on the downhill road whose slope is not so large while receiving a head wind, and the rider may have to perform an extra work for keeping the speed. Moreover, because the regeneration brake force in this technique is a function of a fixed speed. Therefore, even when the stable speed is different depending on the degree of the slope and the rider would like to roughly maintain an arbitrary speed, it is necessary to perform diligent actions such as pedalling and braking.

Furthermore, there is a technique for estimating inclination resistance g(θ) {=human power driving force+motor driving force−acceleration resistance (=acceleration*total mass)−other resistances}, and exerting a regeneration brake force for cancelling the inclination, which corresponds to the inclination resistance. In this technique, the inclination resistance is calculated using the total mass, however, the total mass is unknown. Therefore, an estimated mass is actually used. In addition, other frictional resistances, which are proportional to the speed, a constant frictional resistance, air resistance and the like are also unknown. Therefore, due to a difference with the actual mass and errors of other resistances, the inclination resistance g(θ) obtained by subtracting them has a large error. In other words, the inclination resistance has an offset by the errors regardless of the large or small inclination. Then, especially in case of the small inclination, the very large error occurs, and the boundary between the uphill road and the downhill road is largely shifted. As a result, very unnatural behaviors, which are contrary to the purpose of the original assist operation and are very different from the rider's intention, are observed, such as the automatic regenerative brake does not work even in case of the downhill road, and reversely, even in case of the uphill road, the automatic regenerative brake works so that the rider has to pedal with a large power.

As described above, it is difficult for the conventional techniques to perform the regeneration in conformity with the rider's intention when the regeneration is automatically performed without any rider's effort.

PRIOR TECHNICAL DOCUMENTS

Patent Documents

Patent Document 1: Japanese Laid-open Patent Publication No. 2010-35376
Patent Document 2: Japanese Laid-open Patent Publication No. 2003-204602
Patent Document 3: Japanese Patent No. 4608764
Patent Document 4: International Publication Pamphlet No. WO 2012/086459

SUMMARY OF THE INVENTION

Object to be Solved by the Invention

Therefore, as one aspect, an object of this invention is to provide a technique for enabling the electrically assisted vehicle to perform regeneration control in conformity with the rider's intention.

Means for Solving the Problem

A motor driving control apparatus relating to this invention has (A) a driving unit that drives a motor and (B) a regeneration control unit that controls the driving unit so as to generate a regenerative braking force according to a vehicle acceleration, a vehicle speed and a pedal-rotation converted speed obtained from a pedal rotation.

By determining the regenerative braking force by using those data, it becomes possible to appropriately reflect the rider's intention of an electrically assisted vehicle to the regeneration control.

The aforementioned regeneration control unit may correct a regenerative braking force that corresponds to at least one of the vehicle speed and the vehicle acceleration according to a coincidence degree of the pedal-rotation converted speed with respect to the vehicle speed. For example, according to a value representing a relationship between the vehicle speed and the pedal rotation speed (e.g. a coincidence degree of the pedal rotation speed with respect to the vehicle speed, more specifically, (pedal-rotation converted speed)/(vehicle speed) may be used.), it becomes possible appropriately reflect the rider's intention to the regeneration control.

Moreover, the aforementioned regeneration control unit may control the driving unit so as to linearly or accumulatively increase the regenerative braking force when the vehicle acceleration increases. Thus, by increasing the regenerative braking force so that the vehicle acceleration does not becomes too large, it is possible to collect more electric power, and the safety is heightened.

Furthermore, the aforementioned regeneration control unit may control the driving unit so as to increase the regenerative braking force when the vehicle speed increases. Thus, by increasing the regenerative braking force so that the vehicle speed does not becomes too large, it is possible to collect more electric power, and the safety is heightened.

Furthermore, the aforementioned regeneration control unit may perform correction so that the regenerative braking force that corresponds to at least one of the vehicle speed and the vehicle acceleration increases, when the coincidence degree decreases. For example, by increasing the regenerative braking force when the pedal rotation becomes slow and deviation of the pedal rotation speed from the vehicle speed becomes large, it becomes possible to perform the regeneration control in a natural form.

The regeneration control unit may perform control so that the coincidence degree decreases in accordance with a pedal-rotation converted speed in a reverse rotation direction or so that a correction degree of the regenerative braking force in a state where a pedal rotation stops is kept, when the pedal rotation is reversely performed. By doing so, it becomes possible to reflect the rider's intention to the regeneration control.

The pedal-rotation converted speed may be calculated based on a maximum gear ratio of selectable gear ratios. Compared with converting according to the actual gear change, it is possible to change the pedal-rotation converted speed much stably.

Furthermore, the aforementioned regeneration control unit may perform correction so as to increase the regenerative braking force by using an offset value that corresponds to a pedal-rotation converted speed in a reverse rotation direction, when the pedal rotation is reversely performed. With this configuration, when the rider reversely rotates the pedal, it is possible to directly control the regenerative braking force.

In addition, the aforementioned regeneration control unit may control the driving unit so as to further increase the regenerative braking force in accordance with the vehicle acceleration, when the vehicle acceleration is equal to or greater than a predetermined value. For example, the regenerative braking force is strengthened because of the safety side.

Furthermore, the aforementioned regeneration control unit may control the driving unit so as to further increase the regenerative braking force in accordance with the vehicle speed, when the vehicle speed is equal to or greater than a predetermined value. For example, the regenerative braking force is strengthened because of the safety side.

Furthermore, the aforementioned regeneration control unit may restrict the regenerative braking force, which corresponds to the vehicle speed, the vehicle acceleration and the pedal-rotation converted speed, to be equal to or less than a regenerative braking force determined based on a regenerative efficiency. It is unappropriate to automatically increase the regenerative braking force up to a level at which the regeneration efficiency deteriorates. In addition, the aforementioned regeneration control unit may restrict the regenerative braking force to be equal to or less than a regenerative braking force obtained when regenerative braking by a manual operation is performed.

Furthermore, the aforementioned regeneration control unit may control the driving unit so as to increase the regenerative braking force when an output voltage of a battery for the motor falls. By doing so, the running distance extends, because the charge for the battery is performed more by increasing the regenerative braking force.

In addition, the aforementioned regeneration control unit may set a steady correction amount of the regenerative braking force according to tendency of change of an output voltage of a battery for the motor, and may control the driving unit so as to generate a regenerative braking force corrected by the correction amount. For example, when a utilization mode continues in which the charging is not performed from the external power supply until the battery remaining charge is equal to or less than a reference value, the electric power is collected by strengthening the regenerative braking force steadily. Accordingly, it becomes possible to extend the time until the battery remaining charge is equal to or less than the reference value, and the running distance extends.

It is possible to create a program for causing a microprocessor to execute the aforementioned processing, and the program is stored, for example, in a computer-readable storage medium or storage device such as a flexible disc, an optical disc such as CD-ROM, a magneto-optic disc, a semiconductor memory (e.g. ROM), or a hard disk. Data in processing is temporarily stored in a storage device such as RAM (Random Access Memory).

Effect of the Invention

As one aspect, it is possible to perform the regenerative control in conformity with the rider's intention in the electrically assisted vehicle.

MODE FOR CARRYING OUT THE INVENTION

Embodiment 1

Figure 1:
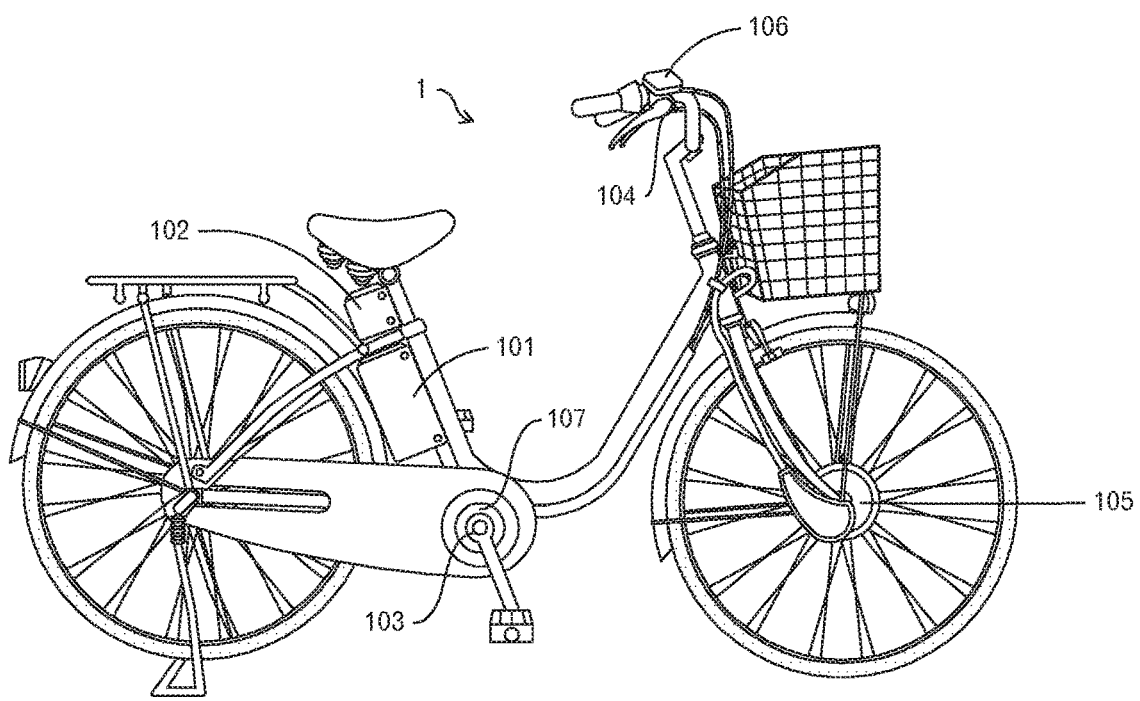
FIG. 1 is an exterior view of an electrically assisted vehicle.

FIG. 1 illustrates an exterior view representing an example of a bicycle with a motor, which is an electrically assisted vehicle in this embodiment. This bicycle 1 with the motor is equipped with a motor driving apparatus. The motor driving apparatus has a secondary battery 101, a motor driving control device 102, a torque sensor 103, a brake sensor 104, a motor 105, an operation panel for instructing whether or not the assist is performed, and a pedal rotation sensor 107.

The secondary battery 101 may be, for example, a lithium ion secondary battery with a nominal reference voltage 24V and a maximum supply voltage of 30V (when fully charged), but other types of batteries such as a lithium ion polymer secondary battery, or a nickel-metal hydride chargeable battery may be used.

The torque sensor 103 is provided on a wheel, which is installed in the crankshaft, detects a pedal force from the rider, and outputs this detection result to the motor driving control device 102. Similarly to the torque sensor 103, the pedal rotation sensor 107 is provided in the wheel, which is installed on the crankshaft, and outputs a signal, which corresponds to the rotation, to the motor driving control device 102. The pedal rotation sensor 107 may be capable of detecting a rotation direction such as regular rotation or counter rotation of the pedal, in addition to detecting a rotation phase angle.

The motor 105 is, for example, a well-known three-phase direct current brushless motor, and mounted on the front wheel of the bicycle 1 with the motor. The motor 105 rotates the front wheel, and also a rotor is connected to the front wheel so as to rotate according to the rotation of the front wheel. Furthermore, the motor 105 is equipped with a rotation sensor such as a hall effect sensor to output rotation information of the rotor (i.e. a hall signal) to the motor driving control device 102.

Figure 2:
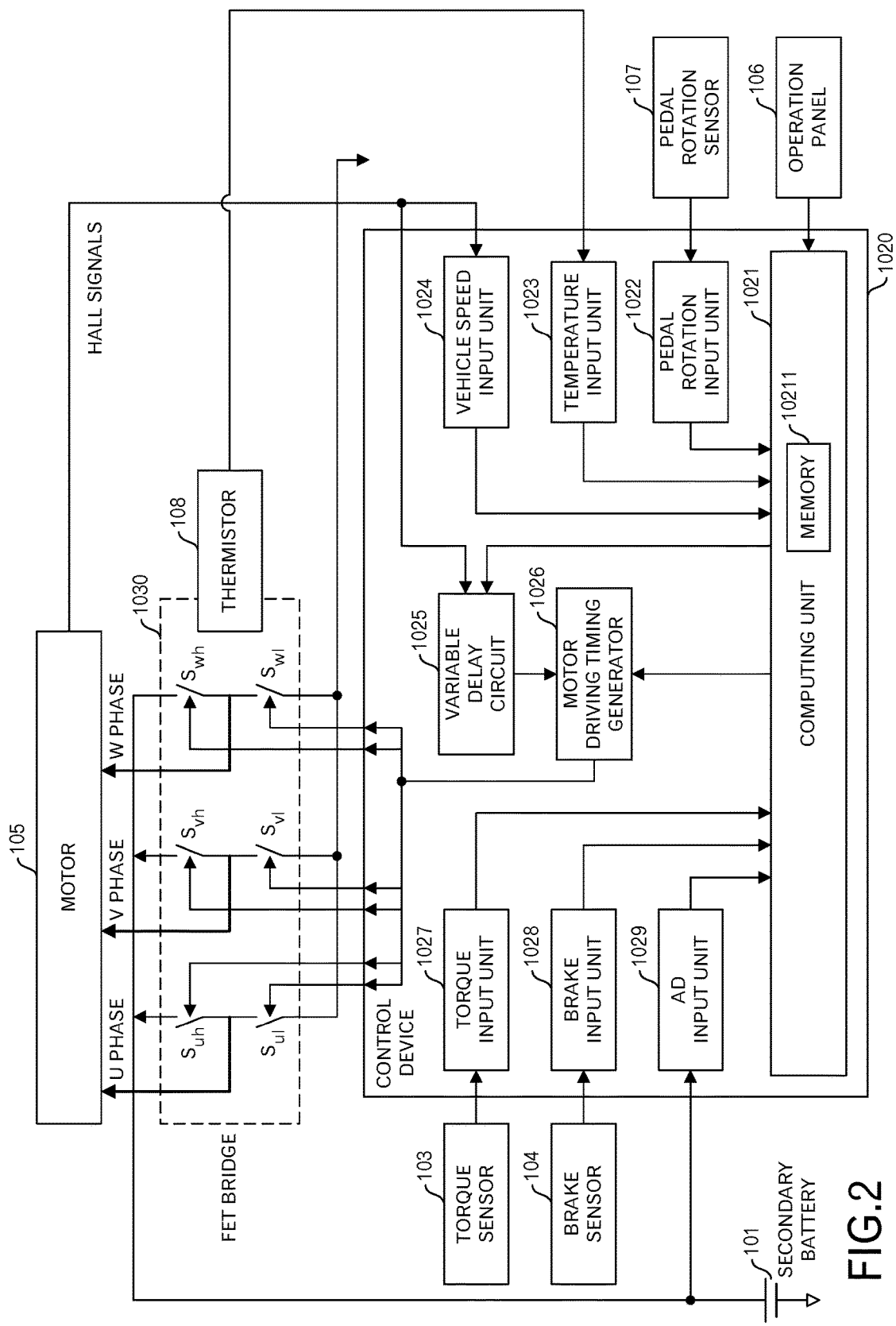
FIG. 2 is a functional block diagram relating to a motor driving control apparatus.

FIG. 2 illustrates a configuration related to the motor driving control device 102 of this kind of bicycle 1 with the motor. The motor driving control device 102 includes a control device 1020, and a FET (Field Effect Transistor) bridge 1030. The FET bridge 1030 includes a high side FET (Suh) and a low side FET (Sul) to perform switching of a U phase of the motor 105, a high side FET (Svh) and a low side FET (Svl) to perform switching of a V phase of the motor 105, and a high side FET (Swh) and a low side FET (Swl) to perform switching of a W phase of the motor 105. This FET bridge 1030 is configured as a portion of the complementary type switching amplifier. Also, a thermistor 108 for measuring the temperature is provided in the FET bridge 1030.

In addition, the control device 1020 includes a computing unit 1021, a pedal rotation input unit 1022, a temperature input unit 1023, a vehicle speed input unit 1024, a variable delay circuit 1025, a motor driving timing generator 1026, a torque input unit 1027, a brake input unit 1028, and an AD input unit 1029.

The computing unit 1021 performs computations described later using input from the operation panel 106 (i.e. on/off of the assist), input from the pedal rotation input unit 1022, input from the temperature input unit 1023, input from the vehicle speed input unit 1024, input from the torque input unit 1027, input from the brake input unit 1028, and input from the AD input unit 1029, and outputs computation results to each of the motor drive timing generator 1026 and the variable delay circuit 1025. The computing unit 1021 includes a memory 10211, and the memory 10211 stores various data used in the computing, data currently in processing, and other data. Further, the computing unit 1021 may be realized by executing a program with a processor, and in this case, the program may be recorded in the memory 10211.

The pedal rotation input unit 1022 digitizes signals representing the pedal rotation phase angle and the rotation direction from the pedal rotation sensor 107, and outputs the digitized signals to the computing unit 1021. However, the pedal rotation sensor 107 may not detect the rotation direction. The temperature input unit 1023 digitizes the inputs from the thermistor 108, and outputs the digitized inputs to the computing unit 1021. The vehicle speed input unit 1024 calculates the front-wheel speed from the hall signals outputted by the motor 105, and outputs the front-wheel speed to the computing unit 1021. The torque input unit 1027 digitizes signals corresponding to the pedal pressure from the torque sensor 103, and outputs the digitized signal to the computing unit 1021. The brake input unit 1028 digitizes signals representing whether or not the brake is applied, from the brake sensor 104, and outputs the digitized signals to the computing unit 1021. The AD (Analog-Digital) input unit 1029 digitizes an output voltage from the secondary battery 101, and outputs the digitized output voltage to the computing unit 1021. Moreover, the memory 10211 may be provided separately from the computing unit 1021.

The computing unit 1021 outputs an advance value as the computing result to the variable delay circuit 1025. The variable delay circuit 1025 adjusts the phases of the hall signals based on the advance value received from the computing unit 1021, and outputs the adjusted hall signals to the motor driving timing generator 1026. The computing unit 1021 outputs, as the computing result, a PWM code corresponding to the PWM duty ratio, for example, to the motor driving timing generator 1026. The motor driving timing generator 1026 generates switching signals and outputs these to respective FETs included in the FET bridge 1030, based on the adjusted hall signals from the variable delay circuit 1025 and the PWM code from the computing unit 1021. The basic operation of the motor driving is described in the International Publication WO2012/086459, and is not a main portion of this embodiment. Therefore, the explanation is omitted here.

Figure 3:
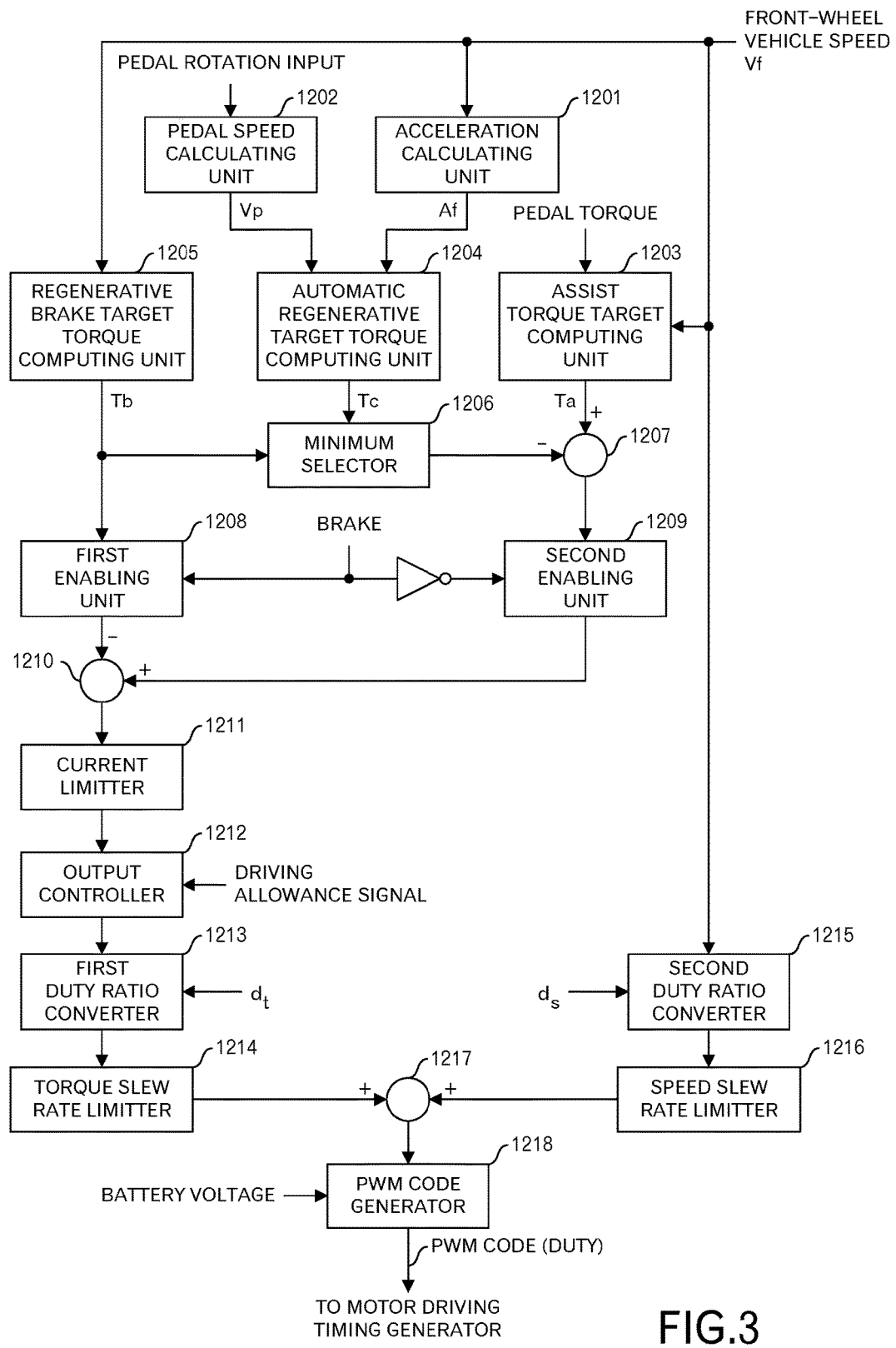
FIG. 3 is a functional block diagram of a computing unit.

Next, FIG. 3 illustrates a functional block diagram of the computing unit 1021. The computing unit 1021 includes an acceleration calculating unit 1201, a pedal speed calculating unit 1202, an automatic regenerative target torque computing unit 1204, a regenerative brake target torque computing unit 1205, an assist torque target computing unit 1203, a minimum selector 1206, an adder 1207, a first enabling unit 1209, a second enabling unit 1208, an adder 1210, a current limitter 1211, an output controller 1212, a first duty ratio converter 1213, a torque slew rate limitter 1214, a second duty ratio converter 1215, a speed slew rate limitter 1216, an adder 1217 and a PWM code generator 1218.

The front-wheel vehicle speed Vf from the vehicle speed input unit 1024 and the pedal torque value from the torque input unit 1027 are inputted into the assist torque target computing unit 1203, and then the assist torque value Ta is calculated. The computing content of the assist torque target computing unit 1203 is not a main portion of this embodiment and is not explained in detail. However, for example, the assist torque target computing unit 1203 extracts ripple components after smoothing the pedal torque value by an LPF, and calculates an assist torque value Ta corresponding to a value obtained by mixing the smoothed pedal torque value and the extracted ripple components at a predetermined mixing ratio. In this computing, the mixing ratio may be adjusted according to the vehicle speed, or the computing may be performed in which, after limiting an assist ratio to be used according to the vehicle speed, the adjusted assist ratio is multiplied with the smoothed pedal torque value. Moreover, the regenerative brake target torque computing unit 1205 calculates a regenerative brake target torque value by performing computation described later according to the vehicle speed value from the vehicle speed input unit 1024. An example of the configuration of the assist torque target computing unit 1203 is described in the International Publication WO2012/086458, for example.

The pedal rotation input from the pedal rotation input unit 1022 is inputted to the pedal speed calculating unit 1202, and the pedal speed calculating unit 1202 calculates a pedal speed Vp from the pedal rotation input. Moreover, the front-wheel vehicle speed Vf is inputted to the acceleration calculating unit 1201, and the acceleration calculating unit 1201 calculates a front-wheel acceleration Af by time-differentiating the front-wheel vehicle speed Vf with high precision. The automatic regenerative target torque computing unit 1204 calculates an automatic regenerative toque Tc from the pedal speed Vp from the pedal speed calculating unit 1202 and the front-wheel acceleration Af from the acceleration calculating unit 1201. The details of the automatic regenerative target torque computing unit 1204 will be explained later. The front-wheel vehicle speed Vf is also inputted to the regenerative brake target torque computing unit 1205, and the regenerative brake target torque computing unit 1205 calculates a manual regenerative brake target torque Tb according to the front-wheel vehicle speed Vf, however, this will be explained later.

The minimum selector 1206 outputs a lesser one of the manual regenerative brake target torque Tb from the regenerative brake target torque computing unit 1205 and the automatic regenerative torque Tc from the automatic regenerative target torque computing unit 1204. Under normal circumstances, the automatic regenerative torque Tc from the automatic regenerative target torque computing unit 1204 is outputted until the automatic regenerative torque Tc exceeds the manual regenerative brake target torque Tb from the regenerative brake target torque computing unit 1205, and when the automatic regenerative torque Tc exceeds the manual regenerative brake target torque Tb, the manual regenerative brake target torque Tb is outputted.

The adder 1207 subtracts the output of the minimum selector 1206 from the assist torque value Ta from the assist torque target computing unit 1203, and outputs the calculation result to the second enabling unit 1209.

When an input signal representing that the brake is applied is inputted from the brake input unit 1028, the first enabling unit 1208 outputs the manual regenerative brake target torque Tb from the regenerative brake target torque computing unit 1205 to the adder 1210. In other cases, the first enabling unit 1208 outputs "0". On the other hand, when an input signal representing that the brake is not applied is inputted from the brake input unit 1028, the second enabling unit 1209 outputs an output from the adder 1207. In other cases, the second enabling unit 1209 outputs "0".

The adder 1210 reverses the polarity of the manual regenerative brake target torque Tb from the first enabling unit 1208 and then outputs the manual regenerative brake target torque Tb with the reversed polarity or outputs a computing result of the adder 1207 from the second enabling unit 1209 as it is. Hereinafter, in order to simplify the explanation, the output of the adder 1210 is abbreviated as a target torque value.

The current limitter 1211 performs current restriction, for example, (A) the restriction of discharging current and charging current of the secondary battery 101 and (B) the current restriction based on the temperature of the FET bridge 1030 (the input from the temperature input unit 1023). The computing content of the current limitter 1211 is not a main portion of this embodiment, and the explanation is omitted. As for the details, please refer to the International Publication WO2012/086459.

When an assist instruction is inputted, for example, from the operation panel 106, it is determined that a driving allowance signal exists, and the output controller 1212 outputs the output from the current limitter 1211 to the first duty ratio converter 1213. On the other hand, when the assist instruction is not inputted from the operation panel 106, it is determined that there is no driving allowance signal, the output controller 1212 outputs "0" to the first duty ratio converter 1213.

The first duty ratio converter 1213 multiplies the output from the output controller 1212 by a conversion coefficient $d_t$ (=duty ratio/torque) to calculate a torque-duty code, and outputs the calculated torque-duty code to the torque slew rate limitter 1214. The torque slew rate limitter 1214 performs a well-known slew rate restriction processing for the output from the first duty ratio converter 1213, and outputs a processing result to the adder 1217.

The second duty ratio converter 1215 multiplies the front-wheel vehicle speed Vf by a conversion coefficient $d_s$ (=duty ratio/front-wheel vehicle speed) to calculate a vehicle-speed duty code, and outputs the calculated vehicle-speed duty code to the speed slew rate limitter 1216. The speed slew rate limitter 1216 performs a well-known slew rate restriction processing for the output from the second duty ratio converter 1215, and outputs a processing result to the adder 1217.

The adder 1217 adds the torque-duty code from the torque slew rate limiter 1214 and the vehicle-speed duty code from the speed slew rate limitter 1216 to calculate a duty code, and outputs the duty code to the PWM code generator 1218. The PWM code generator 1218 multiplies the duty code by a reference voltage (e.g. 24V)/the battery voltage from the AD input unit 1029 to generate a PWM code. The PWM code is outputted to the motor driving timing generator 1026.

Figure 4:
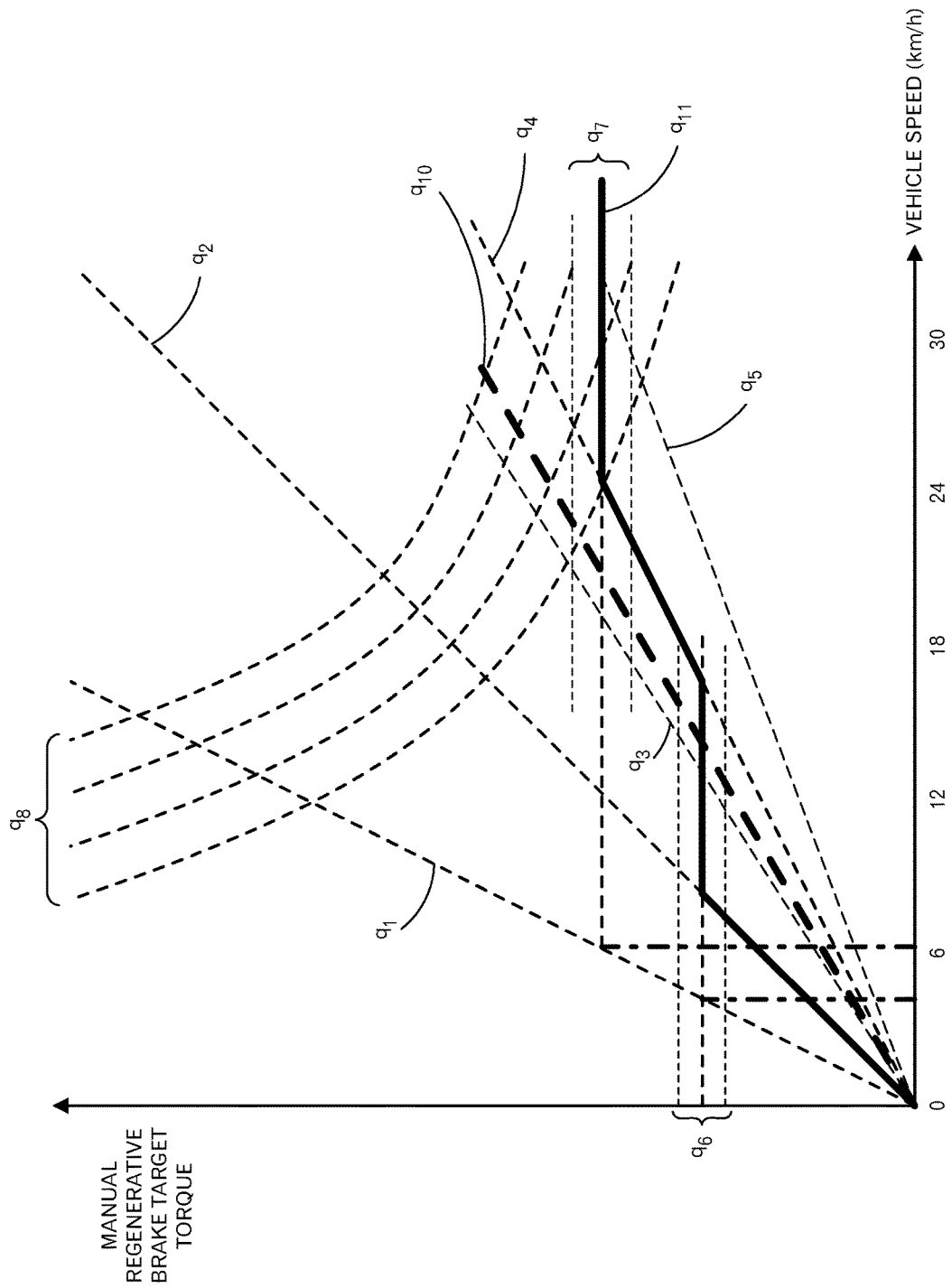
FIG. 4 is a diagram to explain a manual regenerative braking target torque.

Next, how the regenerative brake target torque computing unit 1205 calculates the manual regenerative brake target torque Tb will be explained by using FIGS. 4 to 6. The horizontal axis of FIG. 4 represents the front-wheel vehicle speed Vf, and the vertical axis of FIG. 4 represents the manual regenerative brake target torque Tb. The dotted straight line $q_1$ represents a relationship between the vehicle speed and the torque when the manual regenerative brake target torque value corresponding to the front-wheel vehicle speed is output, and the regenerative efficiency is 0% (short brake). The region above this straight line $q_1$ is the brake that consumes the electric power. Also, the dotted straight line $q_2$ represents a relationship between the front-wheel vehicle speed and the torque when the manual regenerative brake target torque value corresponding to ½ of the front-wheel vehicle speed is output, and the regenerative efficiency is 50% and it is possible to obtain the maximum regenerative electric power. The region above this straight line $q_2$ is a region in which additionally using the mechanical brake is advantageous. Therefore, a suitable curve is adopted in the region below the straight line $q_2$ while taking into consideration restriction conditions.

The instant regenerative efficiency for each speed is determined by a ratio of a regenerative brake voltage at that instant to a counter-electromotive force voltage for the speed at that instant.

Instant regenerative efficiency=1−(regenerative brake voltage/counter-electromotive force voltage)=1−(regenerative torque/torque value corresponding to the vehicle speed).

As for an arbitrary speed and an arbitrary requested stopping distance, in order to obtain the maximum regenerative efficiency for the stopping distance, in other words, totally obtain the maximum amount of regenerative electric power in a state where there is no restriction other than the stopping distance, a curve with an even and constant regenerative efficiency for any speed, in other words, a proportional straight line that passes through the origin is employed. The straight line $q_{10}$ approaches the horizontal axis when the requested stopping distance is sufficiently long, and the regenerative efficiency approaches 100%. In contrast, when the requested stopping distance is somewhat short, the straight line $q_{10}$ becomes the same as the straight line $q_2$, in which the maximum instant regenerative electric power can be obtained, and the total regenerative efficiency is 50% at this time. Further, when the requested stopping distance is much shorter, the regenerative torque curve is still the same as the straight line $q_2$, in which the maximum instant regenerative electric power can be obtained, and the mechanical brake has to be applied additionally. If the regenerative brake torque is equal to or larger than this, the instant regenerative electric power decreases reversely, and it is better to use the mechanical brake.

Also, as restriction conditions to be considered, there are a group of dotted straight lines $q_7$, which are parallel to the horizontal axis and represents the maximum constant braking line during high speeds, a group of dotted straight lines $q_6$, which are parallel to the horizontal axis and represent the minimum constant braking line for low speeds, and so forth.

When actually employing the straight line $q_{10}$, a deceleration curve for time is a curve that decays exponentially, and even when the stopping distance is constant, the stopping time becomes infinite. Therefore, at low speeds, the straight line $q_6$ is employed to maintain a large torque though sacrificing the regenerative efficiency just a bit. Furthermore, when, at further low speeds, the straight line $q_6$ is in a region higher than the straight line $q_2$, the regenerative efficiency does not only worsen, but also the instant regenerative electric power reversely decreases. Therefore, by shifting to the straight line $q_2$, in which the instant regenerative electric power is maximized for respective speeds, and additionally using the mechanical brake, the vehicle is stopped.

In contrast, in case where the speed is high, the brake torque becomes dangerously large when the straight line $q_4$, which is a straight line representing high efficient regeneration with a constant rate, is kept. Therefore, the control is shifted to the straight line $q_7$, in which a constant maximum torque restriction is applied.

For medium speeds, when additionally considering the braking lines (regenerative efficiency from 85% to 65%) with constant rates from 15% to 35%, which are represented by the dotted straight lines $q_3$ to $q_5$, the broken line curve as represented by the thick line $q_{11}$ may be employed. Furthermore, for the medium speeds, the straight line $q_4$ is employed. As a result, highly efficient battery regeneration can be performed during the medium speeds.

Further, as additional restriction conditions, there are a group of curves $q_8$, which represent the battery charge current restriction line set based on the secondary battery 101 (which differs depending on the battery type and state), the straight line $q_2$, which is the line with 50% regenerative efficiency for further low speeds and the like.

When the battery voltage is constant, the regenerative electric power is constant due to the maximum charge current restriction of the battery.

Battery voltage*battery charge current=constant regenerative electric power=motor counter-electromotive force*motor current The motor counter-electromotive force is proportional to the speed, and the motor torque is proportional to the motor current, and the product of them is constant. Therefore, the motor current is inversely proportional to the speed. For this reason, a group of curves $q_8$ are hyperbolic curves that are inversely proportional to the speed. Because the maximum charge current is also variable according to the battery voltage, in other words, the derating based on the remaining battery charge and battery temperature, and the constant regenerative electric power itself is also proportional to the battery voltage according to the previously described expression, the curves are represented as plural hyperbolic curves.

In addition, as for the superiority or inferiority of the regenerative brake, a case is determined to be superior, in which the total regenerative electric power is larger when stopped with a distance that is equal to or less than a constant requested distance (not a constant time) from a state in which the vehicle is running at a constant speed. At this time, when the vehicle cannot be stopped with a distance that is equal to or less than a predetermined distance, the mechanical brake is additionally employed up to a position at which the vehicle can stop. If there is no restriction for the distance that is equal to or less than the constant distance, the regenerative efficiency of ineffective light regenerative braking is determined to be advantageous, by which the vehicle does not quite stop within a range that the mechanical loss has not to be considered, and in such braking, the meaning of the brake is lost. Therefore, the evaluation is performed in a state where the mechanical brake is additionally employed within a range that the vehicle can stop with a distance that is equal to or less than a predetermined distance so as to work as the brake function.

Figure 5:
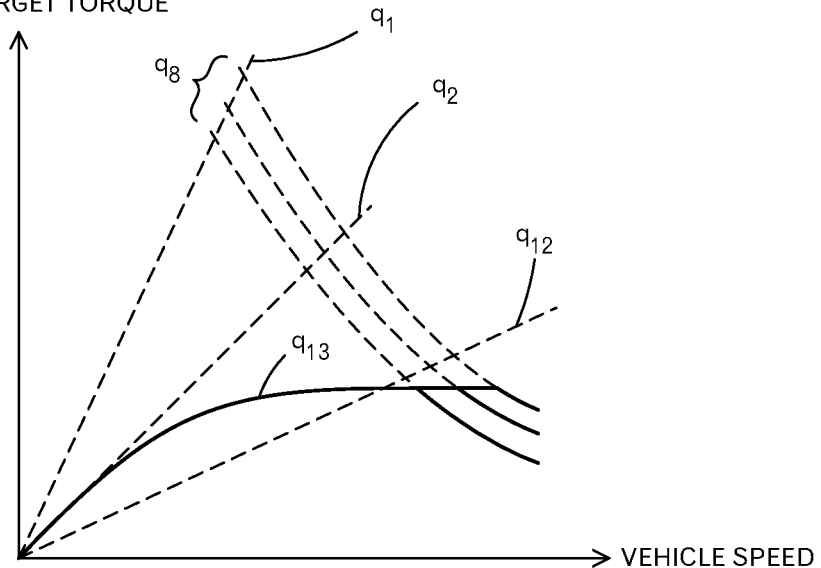
FIG. 5 is a diagram to explain the manual regenerative braking target torque.

The curve $q_{11}$ in FIG. 4 is one example, and the curve $q_{13}$ as illustrated in FIG. 5 may be employed. The curve $q_{13}$ has the same shape as the aforementioned straight line $q_2$ for low speeds, and as the speed increases, the manual regenerative brake target torque value becomes constant, and at high speeds, the manual regenerative brake target torque value is restricted by the group of battery charge current restriction lines $q_8$. Furthermore, the dotted straight line $q_{12}$ represents a 25% braking line (regenerative efficiency is 75%). At high speeds, in the vicinity where the restriction is made by the group of battery charge current restriction lines $q_8$, the manual regenerative brake target torque value falls below this straight line $q_{12}$.

Figure 6:
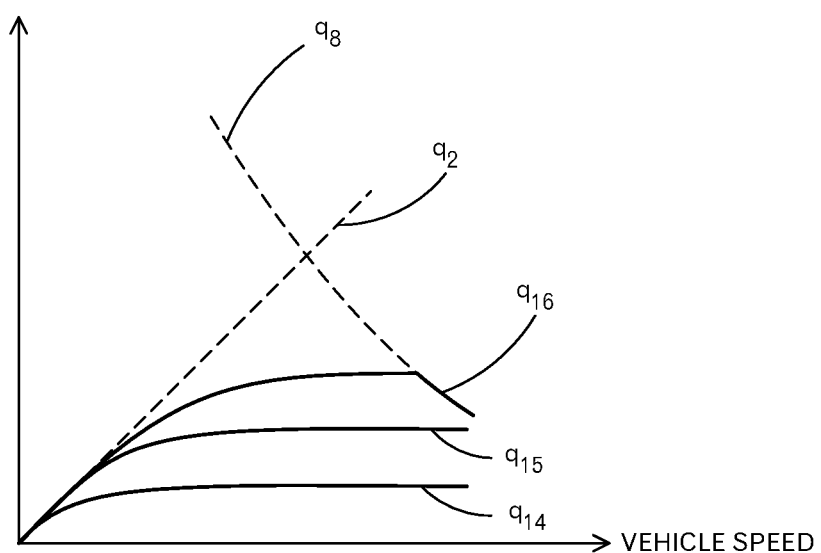
FIG. 6 is a diagram to explain the manual regenerative braking target torque.

In addition, the curve as illustrated in FIG. 6 may be employed. FIG. 6 illustrates an example when a requested brake strength is received from the brake input unit 1028. In this example, when the requested brake strength is small, the curve $q_{14}$ is employed, when the requested brake strength is medium, the curve $q_{15}$ is employed, and when the requested brake strength is large, the curve $q_{16}$ is employed. The curve $q_{16}$ is limited by one of the battery charge current restriction lines $q_8$. In such a case, the curve $q_{16}$ runs along the straight line $q_2$ at low speeds, and will not exceed this straight line. Furthermore, the number of curves is not limited to 3, and three or more curves or two or less curves may be defined. Moreover, a function of the manual regenerative brake target torque value, which changes according to the requested brake strength, may be defined separately.

Figure 7:
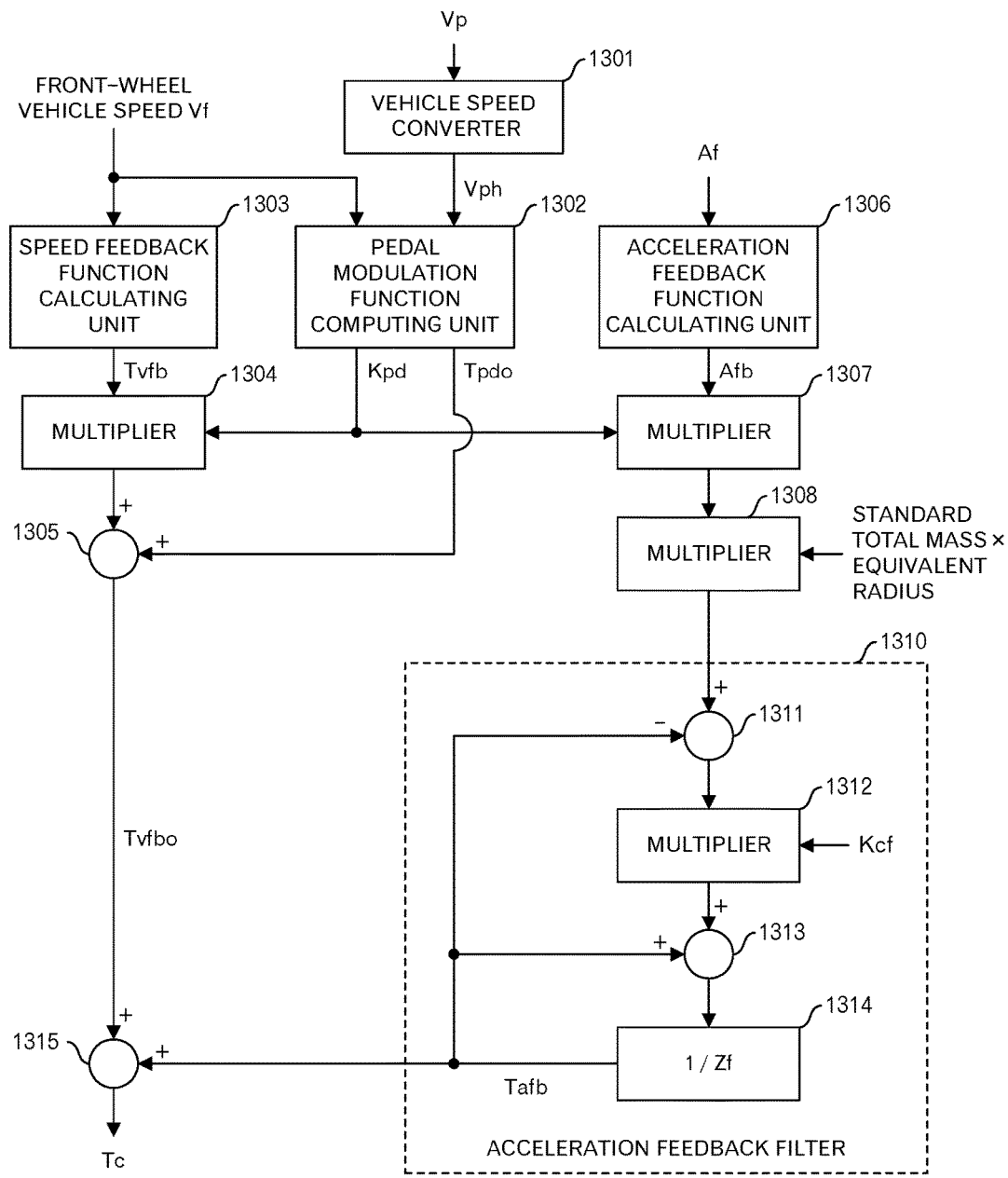
FIG. 7 is a functional block diagram of an automatic regeneration target torque computing unit relating to a first embodiment.

Next, a detailed configuration of the automatic regenerative target torque computing unit 1204 will be explained. As illustrated in FIG. 7, the automatic regenerative target torque computing unit 1204 has a vehicle speed converter 1301, a pedal modulation function computing unit 1302, a speed feedback function calculating unit 1303, a multiplier 1304, an adder 1305, an acceleration feedback function calculating unit 1306, an multiplier 1307, a multiplier 1308, an acceleration feedback filter 1310 and an adder 1315.

In addition, for example, the acceleration feedback filter 1310 is a primary IIR (Infinite Impulse Response)-LPF (Low Pass Filter), and has an adder 1311, a multiplier 1312, an adder 1313 and a delay unit (1/Zf) 1314.

Figure 8:
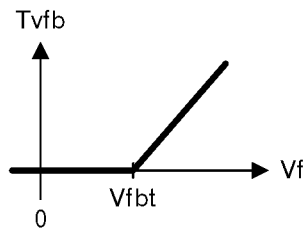
FIG. 8 is a diagram depicting an example of a speed feedback function.

The speed feedback function calculating unit 1303 calculates a value of a preset speed feedback function using the front-wheel vehicle speed Vf as an input. More specifically, the speed feedback function as illustrated in FIG. 8 is used. The horizontal axis of a graph in FIG. 8 represents the front-wheel vehicle speed Vf, and the vertical axis represents an output Tvfb of the speed feedback function. In an example of FIG. 8, when the front-wheel vehicle speed Vf is up to a reference speed Vfbt for speed control in traveling downhill road (e.g. about 18 to 24 km/h), the output Tvfb is "0", however, when the front-wheel vehicle speed Vf is equal to or greater than Vfbt, the output Tvfb increases along a straight line with an inclination Kvfb (a differential feedback coefficient for the speed control in traveling downhill road (torque/speed)). In other words, $$Tvfb = \text{MAX}\{0, Kvfb*(Vf-Vfbt)\} \text{ holds.}$$

The vehicle speed converter 1301 calculates a pedal speed Vph converted by the maximum gear ratio by multiplying the pedal speed Vp, for example, by a predetermined maximum gear ratio. The maximum gear ratio is fixedly used in order to obtain a stable operation. The pedal modulation function computing unit 1302 calculates and outputs a pedal modulation degree Kpd and a pedal offset regenerative torque Tpdo based on the front-wheel vehicle speed Vf and the pedal speed Vph converted by the maximum gear ratio. The computing content of the pedal modulation function computing unit 1302 will be explained in detail later.

The output Tvfb from the speed feedback function calculating unit 1303 and the pedal modulation degree Kpd are inputted into the multiplier 1304, and the multiplier 1304 multiplies Tvfb by Kpd.

On the other hand, the acceleration Af of the front-wheel vehicle speed Vf is inputted to the acceleration feedback function calculating unit 1306, and the acceleration feedback function calculating unit 1306 calculates an output Afb from the acceleration Af, and outputs the output Afb to the multiplier 1307. The calculation content of the acceleration feedback function calculating unit 1306 will be explained in detail later.

The output Afb of the acceleration feedback function calculating unit 1306 and the pedal modulation degree Kpd are inputted to the multiplier 1307, and the multiplier 1307 multiplies Afb by Kpd.

Then, the output Afb*Kpd of the multiplier 1307, and {a standard total mass (e.g. 80 Kg)*an equivalent radius (an equivalent wheel radius, which is converted by the direct driving in which the motor deceleration ratio is considered)} are inputted into the multiplier 1308, and the multiplier 1308 calculates, as a torque, Afb*Kpd*the standard total mass*equivalent radius.

In the acceleration feedback filter 1310, the adder 1311 calculates {(output of the multiplier 1308)−(output Tafb of the acceleration feedback filter 1310)}, and the multiplier 1312 calculates a product of the output of the adder 1311 and a cut-off frequency coefficient Kcf of the acceleration feedback (e.g. about 1/192. This is determined within a range from 1/1024 to 1/64.), and the adder 1313 adds the output of the multiplier 1312 and the output Tafb of the acceleration feedback filter 1310, and the delay unit 1314 delays the input by a computing frame unit to generate an output Tafb.

On a route of the acceleration feedback, the acceleration is directly fed back as an inverse acceleration. Therefore, there is a possibility that a control system becomes unstable and the hunting is caused due to delays of a detection system and an execution system if no countermeasure is employed. Then, the acceleration feedback filter 1310 that is an IIR filter of the primary delay element is inserted as a stabilization loop filter.

As for a rout of the speed feedback, the vehicle speed is fed back as the regenerative torque and as being proportional to the inverse acceleration. However, because integral elements originally exist while reflecting the inverse acceleration to the vehicle speed, the loop becomes stable, and no filter is provided, especially.

The adder 1305 adds the output Tvfb*Kpd of the multiplier 1304 and the pedal offset regenerative torque Tpdo from the pedal modulation function computing unit 1032, and outputs an addition result Tvfbo to the adder 1315.

The output Tvfbo of the adder 1305 and the output Tafb of the acceleration feedback filter 1310 are inputted to the adder 1315, and the adder 1315 calculates Tvfbo+Tafb=Tc.

Figure 9:
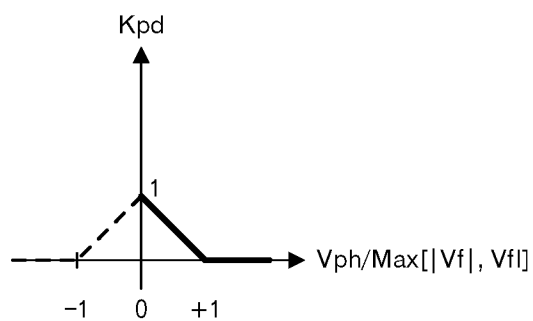
FIG. 9 is a diagram depicting an example of a pedal modulation function.

Next, the pedal modulation function computing unit 1302 will be explained in detail. The pedal modulation function computing unit 1302 calculates a pedal modulation degree Kpd based on the pedal speed Vph converted by the maximum gear ratio and the front-wheel vehicle speed Vf as illustrated, for example, in FIG. 9. In an example of FIG. 9, the horizontal axis represents Vph/MAX [|Vfl, Vfl], and the vertical axis represents the pedal modulation degree Kpd. In FIG. 9, an example is illustrated by a solid line, in which the rotation direction of the pedal cannot be detected. Vfl is a relaxed least pedal speed (about 2 Km/h), and is set in order to prevent from the output value of the pedal modulation function being unstable in the vicinity of Vf=0. In other words, in case where |Vf| is up to 2 Km/h, the pedal modulation degree Kpd is obtained according to Vph/Vfl. Vph/Vf is "1" in case of Vph=Vf, and in case where there is a difference between Vph and Vf, Vph/Vf deviates from"1". Therefore, it can be said that Vph/Vf represents a coincidence degree. In case of the pedal modulation function in FIG. 9, when Vph>|Vfl|holds (i.e. the pedal speed Vph converted by the maximum gear ratio is faster than the front-wheel vehicle speed |Vfl), Vph/|Vfl is greater than "1", however Kpd is equal to "0". On the other hand, when Vph<|Vfl holds (i.e. the front-wheel vehicle speed |Vfl is faster than the pedal speed Vph converted by the maximum gear ratio. In other words, the pedal rotation becomes slow.), the value of Vph/|Vfl becomes less, and the pedal modulation degree Kpd becomes greater. Then, when Vph/Vf is "0", in other words, Vph=0 holds, Kpd becomes "1". The dotted line in FIG. 9 represents an example of a case where the rotation direction of the pedal can be detected.

As described above, the pedal modulation degree Kpd, which corresponds to the coincidence degree between the front-wheel vehicle speed Vf and the pedal speed Vph converted by the maximum gear ratio, is outputted. Especially, in case of Vph<|Vfl, the pedal modulation degree Kpd becomes greater, when the coincidence degree is less. In other words, this affects so that the automatic regenerative brake target torque becomes greater. For example, in a state where the front-wheel vehicle speed Vf is equal to or greater than Vfl and the speed is somewhat fast, when the rotation speed of the pedal decreases, the automatic regenerative brake target torque becomes greater according to a deviation degree of the pedal speed Vph converted by the maximum gear ratio from the front-wheel vehicle speed Vf.

Figure 10:
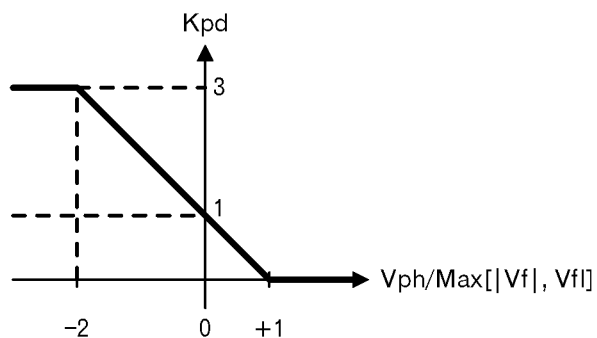
FIG. 10 is a diagram depicting another example of the pedal modulation function.

Moreover, when the rotation direction of the pedal is detected, a pedal modulation function as illustrated in FIG. 10 may be employed. A graph in FIG. 10 is similar to that in FIG. 9, and a positive portion of Vph/MAX [|Vfl, Vfl] is the same as that in FIG. 9.

On the other hand, a negative portion of Vph/MAX [|Vfl, Vfl] represents change of the pedal modulation degree Kpd when the pedal reversely rotates. In case of the thick line, until Vph/MAX [|Vfl, Vfl] becomes "−2", the pedal modulation degree Kpd monotonously increases with the same inclination as that in case where Vph/MAX [|Vfl, Vfl] is positive, and when Vph/MAX [|Vfl, Vfl]=−2 holds, Kpd becomes "3". When Vph/MAX [|Vfl, Vfl] is less than "−2", Kpd=3 is kept. Thus, by reversely rotating the pedal more, a greater regenerative brake target torque is set.

Kpd is represented as follows:

$$Kpd=\text{Min}[3,\text{Max}[0,(1-Vph/\text{Max}[|Vf|,Vfl])]]$$

In addition, as depicted by the dotted line, Kpd=1 in case of Vph/MAX [|Vfl, Vfl]=0 may be kept even when Vph/MAX [|Vfl,. Vfl] becomes a negative value.

Figure 11:
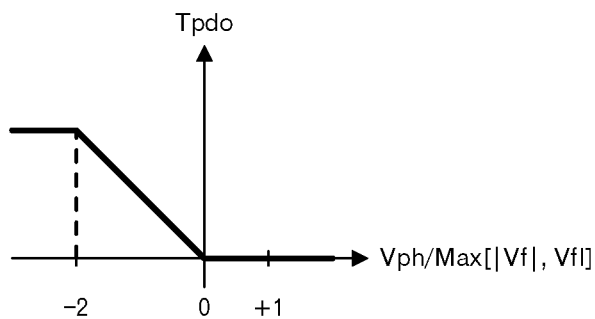
FIG. 11 is a diagram depicting an example of a pedal offset regenerative torque.

Moreover, the pedal offset regenerative torque Tpdo is "0" when the reverse rotation of the pedal cannot be detected. On the other hand, when the reverse rotation of the pedal can be detected, a function for the pedal offset regenerative torque as illustrated in FIG. 11 is used. In an example of FIG. 11, when Vph/MAX[|Vfl, Vfl] is equal to or greater than "0", the pedal offset regenerative torque Tpdo=0 is kept, however, when the pedal reversely rotates and Vph/MAX [Vf, Vfl] becomes negative, Tpdo monotonously increases according to Vph/MAX[|Vfl, Vfl] until Vph/MAX[|Vfl, Vfl] becomes "−2" and Tpdo becomes "2", for example. When Vph/MAX[|Vfl, Vfl] becomes less than "−2", Tpdo=2 is kept.

When the pedal modulation degree Kpd in FIG. 10 is used, it is possible to intentionally apply the regenerative brake according to the reverse rotation operation of the pedal on the downhill road. However, because a natural acceleration on a flat area becomes zero or negative a bit, an output of the acceleration feedback function, which will be explained below, also becomes zero. Therefore, it is impossible to apply the regenerative brake by only a product of the pedal modulation degree and the output of the acceleration feedback function.

Then, as another output of the pedal modulation function computing unit 1302, this pedal offset regenerative torque Tpdo is generated. By doing so, it is possible to make an offset for the automatic regenerative torque Tc so as to intentionally strength the regenerative brake, and even in case of the flat area and the uphill road, it becomes possible to use the regenerative brake like a coaster brake.

Figure 12:
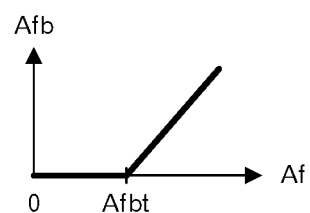
FIG. 12 is a diagram depicting an example of an acceleration feedback function.

Next, the acceleration feedback function calculating unit 1306 will be explained in detail. FIG. 12 illustrates an example of an acceleration feedback function. In an example of FIG. 12, the horizontal axis represents the acceleration Af and the vertical axis represents the output Afb. In the example of FIG. 12, until the acceleration is less than a threshold Afbt, Afb=0 holds. However, when the acceleration becomes equal to or greater than the threshold Afbt, the output Afb increases with a predetermined inclination.

Figure 13:
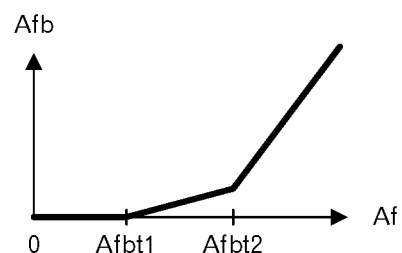
FIG. 13 is a diagram depicting an example of the acceleration feedback function.

In addition, the acceleration feedback function as illustrated in FIG. 13 may be employed. In an example of FIG. 13, until the acceleration Af becomes a first threshold Afbt1, Afb=0 holds, however, when the acceleration Af exceeds the first threshold Afbt1, Afb increases with a first inclination, and when Afb exceeds a second threshold Afbt2, Afb further increases with a second inclination. The second inclination is greater than the first inclination, and when the acceleration becomes greater, Afb drastically increases, and as a result, a large automatic regenerative torque is set and the regenerative brake becomes strong.

The pedal modulation degree Kpd is also multiplied with the output Afb of the acceleration feedback function. Therefore, the regenerative braking force for the acceleration also becomes a value corresponding to the pedal modulation degree.

In any case of FIG. 12 and FIG. 13, the acceleration is fed back by the final acceleration feedback coefficient Kafb=Afb/Af. Therefore, the final acceleration is suppressed to a 1/(1+Kafb)-fold acceleration.

Figure 14:
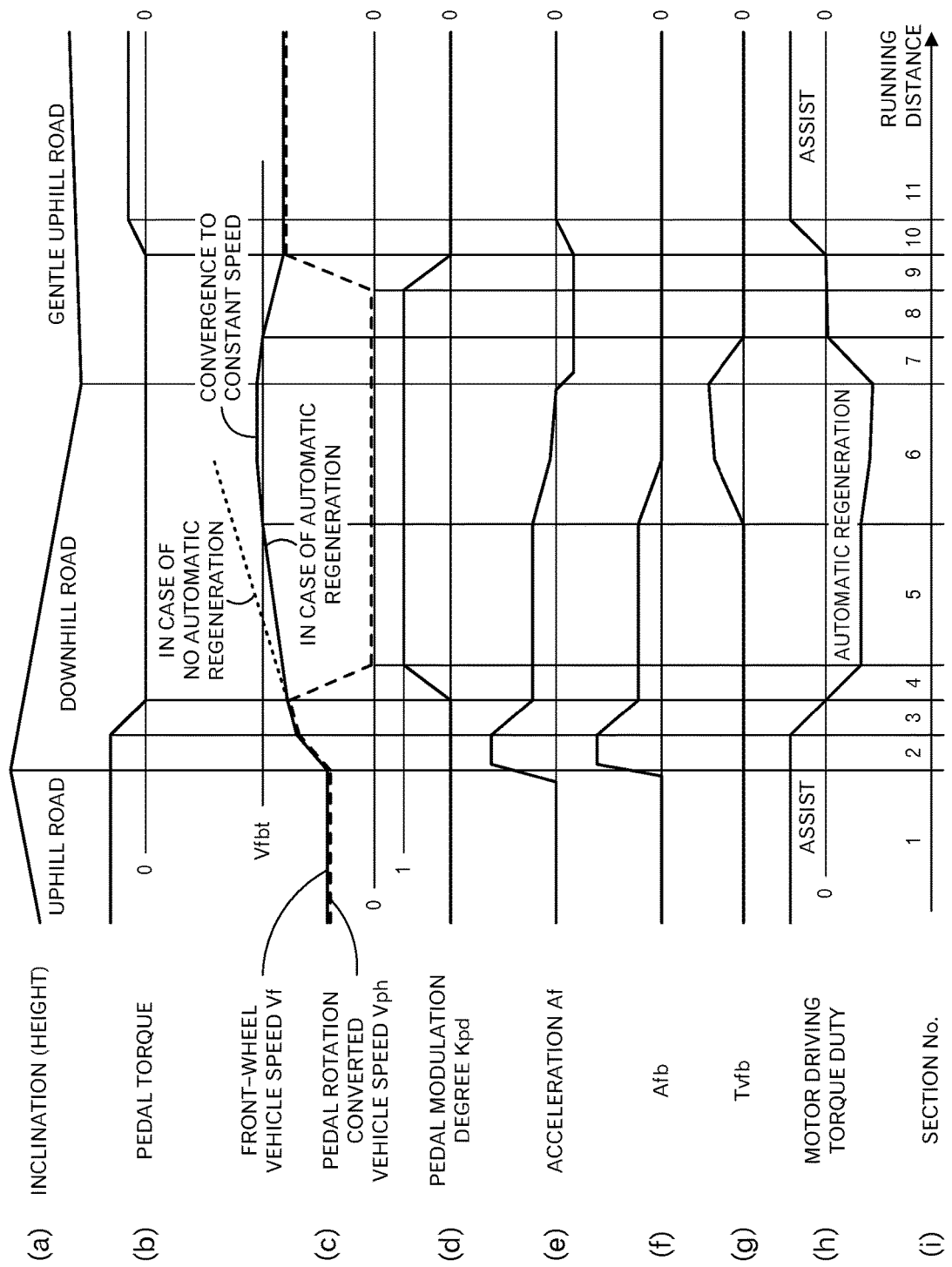
FIG. 14 is a diagram depicting an example of transitions of control modes.

FIG. 14 illustrates an example of a control mode in case where this embodiment is implemented. As illustrated in (a) of FIG. 14, after a section (1) of the uphill road, the bicycle runs sections (2) to (6) of a long downhill road, and after that, the bicycle runs sections (7) to (11) of a long gentle uphill road.

As illustrated in (b) of FIG. 14, the pedal torque of a certain value is kept until the section (2), however, the pedal torque decreases in the section (3) because of the downhill road, and the pedal torque becomes zero in the section (4). The pedal torque increases in the section (10) because of the uphill road.

In addition, as illustrated in (c) of FIG. 14, the front-wheel vehicle speed Vf is identical with the pedal speed Vph converted by the maximum gear ratio from the section (1) to the section (3), however, because the rider does not pedal on the downhill road, Vph decrease in the section (4), and deviates from the front-wheel vehicle speed Vf.

Then, as illustrated in (d) of FIG. 14, the pedal modulation degree Kpd increases from zero in the section (4) and reaches "1" in the section (5). Thus, the pedal modulation degree Kpd smoothly increases.

In contrast, as illustrated in (e) of FIG. 14, the acceleration Af increases until the section (2), however, the acceleration Af decreases in the section (3), and the acceleration of a certain value is kept in the section (4). As illustrated in (f) of FIG. 14, the output Afb of the acceleration feedback function varies almost similarly to the acceleration Af, however, in the section (4), the output Afb of a certain value is kept, and the pedal modulation degree Kpd is not "0". Therefore, as illustrated in (h) of FIG. 14, in the section (4), the automatic regeneration begins and the output Afb smoothly increases.

As illustrated in (h) of FIG. 14, because the automatic regeneration begins from the section (4), the increase of the front-wheel vehicle speed Vf is suppressed compared with a case in which the automatic regeneration is not performed.

Even when the increase of the front-wheel vehicle speed Vf is suppressed compared with the case where the automatic regeneration is not performed, the front-wheel vehicle speed Vf gradually increases in the section (5), the front-wheel vehicle speed Vf exceeds the threshold Vfbt in the section (6). When the front-wheel vehicle speed Vf exceeds the threshold Vfbt, the output Tvfb of the speed feedback function also starts its increase. Therefore, the automatic regeneration increases as illustrated in (h) of FIG. 14. Therefore, as illustrated in (c) of FIG. 14, the increase of the front-wheel vehicle speed Vf is further suppressed. As illustrated in (e) and (f) o FIG. 14, the acceleration Af and the output Afb of the acceleration feedback function decrease. When the acceleration Af is equal to or less than the threshold, the output Afb of the acceleration feedback function becomes zero.

Shifting to the uphill road in the section (7), the front-wheel vehicle speed Vf decreases as illustrated in (c) of FIG. 14, the output Tvfb of the speed feedback function decreases, and the acceleration Af also decreases below zero. The output Afb of the acceleration feedback function is already zero in the section (6), and is zero also in the section (7). Moreover, as illustrated in (g) of FIG. 14, the acceleration is negative, therefore, the vehicle speed decreases, and the output Tvfb of the speed feedback function also decreases. Therefore, the automatic regeneration smoothly decreases.

Shifting to the section (8), the front-wheel vehicle speed Vf falls below the threshold Vfbt, and the output Tvfb of the speed feedback function also becomes zero. Moreover, the automatic regeneration also becomes zero.

Shifting to the section (9), the rider starts pedaling on the uphill road, and when the pedal rotation converted vehicle speed Vph increases as illustrated in (c) of FIG. 14, the pedal modulation degree Kpd decreases as illustrated in (d) of FIG. 14. Shifting to the section (10), as illustrated in (c) of FIG. 14, the pedal rotation converted vehicle speed Vph reaches the front-wheel vehicle speed Vf, and as illustrated in (d) of FIG. 14, the pedal modulation degree Kpd also becomes zero. When the pedal rotation converted vehicle speed Vph reaches the front-wheel vehicle speed Vf, the pedal torque increases and the assist is performed as illustrated in (b) and (h) of FIG. 14. In the section (11), the assist continues.

Thus, when the pedal pressure is lost on the uphill road, flat area or very little downhill road, firstly coasting is performed, and the automatic regeneration brake is not applied suddenly. Therefore, there is no artificiality. At this time there is no relation with the actual weight.

Moreover, when the bicycle runs on the downhill road with a certain inclination or more, the automatic regenerative braking force is applied while continuously changing until the pedal rotation stops since the pedal pressures is lost. Therefore, when the rider appropriately controls the rotation by himself, it is possible to control the effect of the automatic regeneration brake moderately.

Furthermore, when the pedal rotation sensor 107 that can detect the regular rotation and the reverse rotation is used, by defining the pedal modulation function as illustrated in FIG. 10, it is possible to keep the regenerative braking force not only when the pedal rotation stops but also when the pedal rotates reversely, and it is also possible to actively strengthen the regenerative braking force on the reverse rotation side. Accordingly, it is possible to broaden the control range of the regenerative braking force by the rider.

Furthermore, as illustrated in FIG. 11, by generating the pedal offset regenerative torque Tpdo according to the reverse rotation of the pedal and further offsetting a product of the output of the speed feedback function and the pedal modulation degree, it is also possible to intentionally apply the regenerative braking by an arbitrary regenerative brake torque even on the flat area and the uphill road.

Furthermore, because no control is performed that (the estimated standard total mass*the acceleration) is subtracted from (the human force+the motor driving force), an unpredicted offset, which is caused by a difference between the standard total mass and the actual total mass, is not added to the estimation of the acceleration on the downhill road.

Also in this embodiment, the standard total vehicle weight is used instead of the actual total vehicle weight, however, the standard total vehicle weight is used only for a unit conversion from the regenerative acceleration in the acceleration feedback system to the regenerative driving force (i.e. regenerative torque). Therefore, even if the standard total vehicle weight includes an error of +/−20%, the feedback gain (=Kafb) that affects so as to decrease a substantial inclination merely varies a little. In other words, the effect of decreasing the inclination merely varies a little, and the offset for the regenerative driving force does not occur. Therefore, wrong distinction between the uphill road and the downhill road never occurs.

Moreover, after detecting the acceleration on the downhill road as a result, the braking servo is applied. Therefore, the regenerative brake is applied only when the regenerative brake is originally required.

Moreover, because the minimum selector 1206 restricts so that the automatic regenerative force is always equal to or less than the braking force of the manual regenerative brake, an opposite phenomenon does not occur in which the braking force decreases and the acceleration is reversely made when the manual regenerative brake is applied. In addition, it is possible to avoid a phenomenon in which the regenerative electric power reversely decreases because the automatic regenerative braking force becomes too strong.

Furthermore, it is possible to freely control, on the downhill road, the regenerative brake that changes smoothly, automatically and intentionally, and it is also possible to freely and intentionally control the regenerative brake also on the flat area and the uphill road.

Summarizing the aforementioned matters, the regenerative braking force is applied as required in a form that is not contrary to the rider's intention and according to the change of the running environment, the pedaling state and the speed at that time. Therefore, because there is no troublesomeness to frequently perform the braking operation, an opportunity that the regenerative brake is used instead of the mechanical brake is increased as many as possible and the torque is suppressed to a necessary and sufficient torque less than the manual regenerative brake, the regenerative efficiency is heightened, and the power consumption from the battery is saved, and it is possible to extend the assisted running distance. In addition, a danger that the bicycle accelerates to excessive speed on the downhill road is automatically prevented.

In order to simplify the explanation of the elements, the speed feedback function is handled, in the aforementioned explanation, as being independent with the acceleration feedback function. However, the regenerative torque that has the synergistic effect for the speed and acceleration may be outputted.

Furthermore, as for a relation between the pedal modulation function and the speed feedback function or the acceleration feedback function, a configuration using a simple product of them was explained above. However, an integrated function of three inputs of the pedal modulation function, the speed feedback function and the acceleration feedback function may be used as being a smooth and effective function.

As for such a complex function, a complex expression may be defined and computed in real time, or a table that represents a function of three-dimensional inputs and two dimensional outputs may be stored in advance in the memory 10211 or the like, and may be referenced in the real-time to compute interpolation.

In addition, in the aforementioned example, the regenerative braking force is controlled according to the pedal rotation by multiplying the output of the acceleration feedback function and the output of the speed feedback function by the pedal modulation degree. However, the control may be performed in a direction of heightening the threshold Afbt of the acceleration feedback function and/or the threshold Vfbt of the speed feedback function when the pedal rotation speed becomes higher. Moreover, such threshold control and the multiplication may be combined, or a different method may be applied to each of the acceleration feedback function and the speed feedback function.

Embodiment 2

Figure 15:
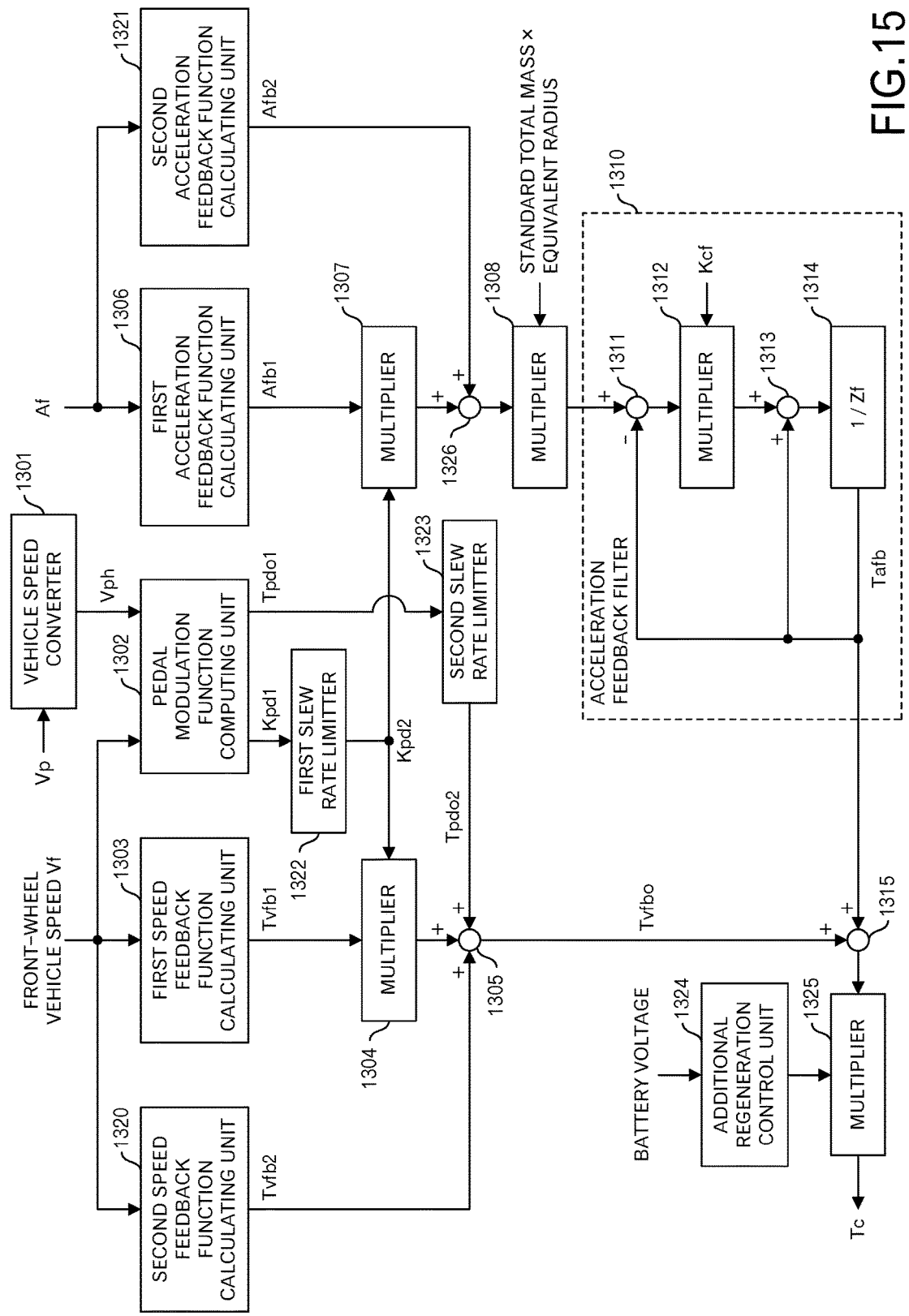
FIG. 15 is a functional block diagram of an automatic regeneration target torque computing unit relating to a second embodiment.

As for the automatic regenerative target torque computing unit 1204, a configuration as illustrated in FIG. 15 may be employed instead of the configuration illustrated in FIG. 7.

The automatic regenerative target torque computing unit 1204 relating to this embodiment has a vehicle speed converter 1301, a pedal modulation function computing unit 1302, a first speed feedback function calculating unit 1303, a multiplier 1304, an adder 1305, a first acceleration feedback function calculating unit 1306, a multiplier 1307, a multiplier 1308, an acceleration feedback filter 1310, an adder 1315, a second speed feedback function calculating unit 1320, a second acceleration feedback function calculating unit 1321, a first slew rate limitter 1322, a second slew rate limitter 1323, an adder 1326, an additional regeneration control unit 1324 and a multiplier 1325.

Moreover, the acceleration feedback filter 1310 is a primary IIR (Infinite Impulse Response)-LPF (Low Pas Filter), for example, and has an adder 1311, a multiplier 1312, an adder 1313 and a delay unit (1/Zf) 1314.

Elements to which the same reference number is attached have the same function. In other words, the first speed feedback function calculating unit 1303 has the same function as that of the speed feedback function calculating unit 1303 in the first embodiment. In addition, the first acceleration feedback function calculating unit 1306 has the same function as that of the acceleration feedback function calculating unit 1306 in the first embodiment.

A difference with the automatic regenerative target torque computing unit 1204 relating to the first embodiment in FIG. 7 is (A) a point that, by introducing the second speed feedback function calculating unit 1320, the feedback is performed in accordance with the speed without any relationship with the pedal modulation degree Kpd2, and then the addition is performed by the adder 1305.

Figure 16:
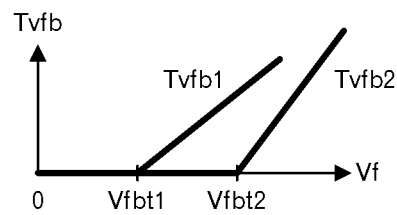
FIG. 16 is a diagram to explain first and second speed feedback functions.

The second speed feedback function will be explained by using FIG. 16, for example. As illustrated in FIG. 16, the horizontal axis represents the speed Vf, and the vertical axis represents an output value of the speed feedback function. The first speed feedback function linearly increases with a first inclination when the speed exceeds the threshold Vfbt1, however, the second speed feedback function linearly increases with a second inclination when the speed exceeds the threshold Vfbt2 that is greater than the threshold Vfbt1. It is preferable that the second inclination is greater than the first inclination. Thus, when the speed is greater than the threshold Vfbt2, the large regeneration brake is applied, because the safety has to be considered.

Furthermore, another difference with the automatic regenerative target torque computing unit 1204 relating to the first embodiment in FIG. 7 is (B) a point that, by introducing the second acceleration feedback function calculating unit 1321, the feedback is performed in accordance with the acceleration without any relationship with the pedal modulation degree Kpd2, and the addition to the output of the multiplier 1307 is performed by the adder 1326.

Figure 17:
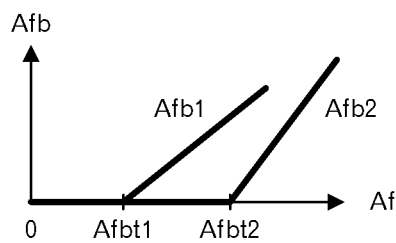
FIG. 17 is a diagram to explain first and second acceleration feedback functions.

The second acceleration feedback function calculating unit 1321 will be explained by using FIG. 17. As illustrated in FIG. 17, the horizontal axis represents the acceleration Af, and the vertical axis represents the output value of the acceleration feedback function. The first acceleration function linearly increases with a first inclination when the acceleration exceeds the threshold Afbt1, however, the second acceleration feedback function linearly increases with a second inclination when the acceleration exceeds the threshold Afbt2 that is greater than the threshold Afbt1. It is preferable that the second inclination is greater than the first inclination. Thus, when the acceleration is greater than the threshold Afbt2, the large regenerative brake is applied, because the safety has to be considered.

Thus, in this embodiment, in addition to an element that the suppression of the speed and acceleration is controlled according to the rider's intention, the suppression of them is prioritized regardless of the rider's intention when the bicycle runs at higher acceleration or higher speeds. Therefore, keeping the safety speed is prioritized on very high acceleration, in other words, on a steep downhill road or at high speeds.

Furthermore, another difference with the automatic regenerative target torque computing unit 1204 relating to the first embodiment in FIG. 7 is (C) a point that the pedal modulation degree Kpd1 that is an output of the pedal modulation function computing unit 1302 is inputted into the first slew rate limitter 1322, and the pedal offset regenerative torque Tpdo1 is inputted to the second slew rate limitter 1323.

The automatic regenerative braking force is continuously changed according to the change of the pedal speed, however, when the rotation of the pedal is suddenly stopped by the rider's intention, the regenerative brake is suddenly applied. In order to prevent the shock of this regenerative brake, the slew rate restriction of the pedal modulation degree and the pedal offset regenerative torque is set.

These slew rate limiters have an asymmetric characteristic of the slew rate restriction, in which the change is slow in an increasing direction and the change is rapid in a decreasing direction, in order to release the brake relatively immediately without disturbing the pedaling when the pedaling begins.

Furthermore, another difference with the automatic regenerative target torque computing unit 1204 relating to the first embodiment in FIG. 7 is (D) a point that, by introducing the additional regeneration control unit 1324, the multiplier 1325 multiplies the output of the adder 1315 by a regeneration additional rate.

Figure 18:
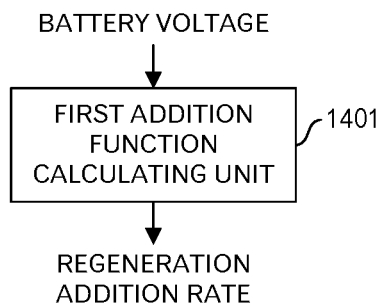
FIG. 18 is a functional block diagram of an additional regeneration control unit.

In the additional regeneration control unit 1324, the first addition function calculating unit 1401 calculates an additional rate by using a first addition function according to the battery voltage inputted from the AD input unit 1029, as illustrated in FIG. 18, for example.

Figure 19:
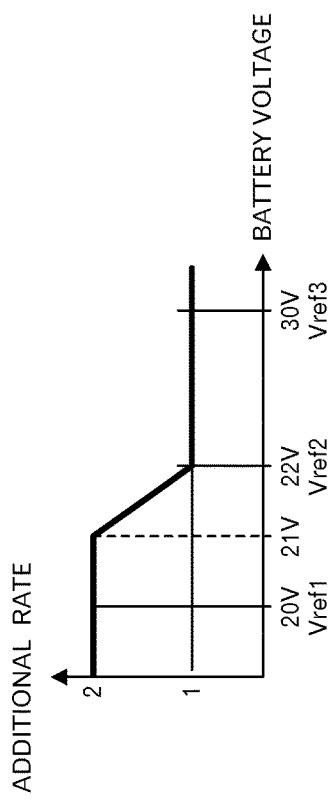
FIG. 19 is a diagram depicting an example of a first addition function.

FIG. 19 illustrates an example of the first addition function. In FIG. 19, the horizontal axis represents the battery voltage, and the vertical axis represents the additional rate. In this example, in case of full charge, the battery voltage is Vref3 (=30V), and when the power supply is performed, the battery voltage gradually goes down and becomes a reference voltage Vref2 (=22V) for low remaining charge. The additional rate is "1" until this reference voltage Vref2 for the low remaining charge, and the addition of the regeneration amount is not performed. When the battery voltage falls below Vref2, the additional rate linearly increases until the additional rate becomes "2", for example, at 21V. The additional rate is fixed to be "2" when the battery voltage is equal to or lower than 21V, however, because the discharge is stopped when the battery voltage becomes a stop voltage Vref1 (=20V), the additional rate is effective when the battery voltage is equal to or higher than Vref1.

Figure 20:
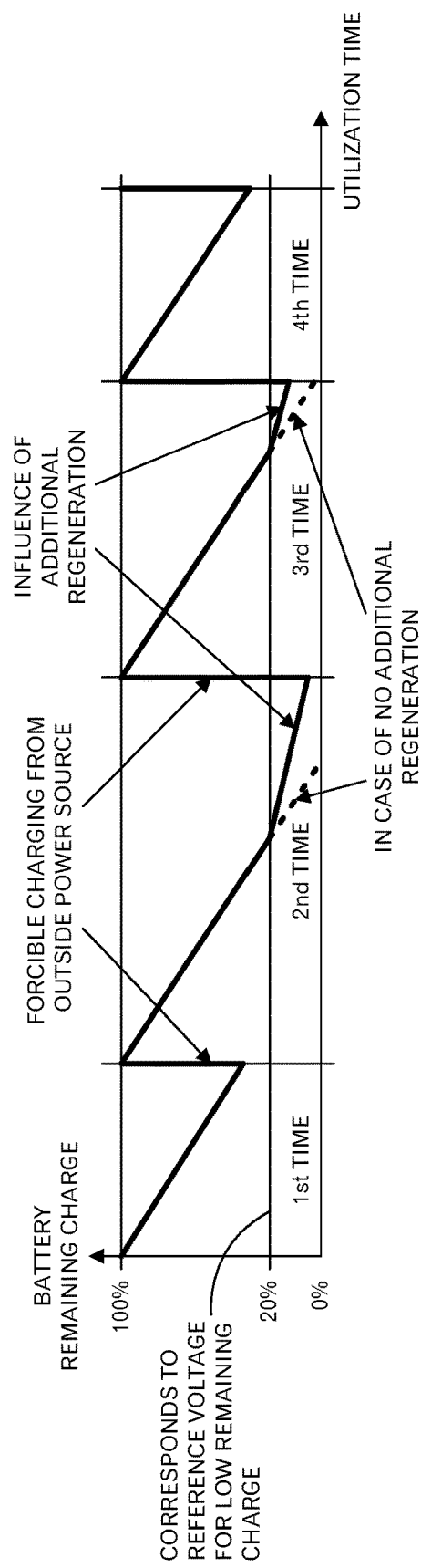
FIG. 20 is a diagram depicting an example of temporal change of battery remaining charge on the assumption of the first addition function.

FIG. 20 illustrates an example of temporal change of the battery remaining charge in case where the control of the additional regeneration is performed, for example. In an example of FIG. 20, the vertical axis represents the battery remaining charge (%) and the horizontal axis represents a utilization time. The thick line represents temporal change of the battery remaining charge, and it is assumed that the battery remaining charge 20% corresponds to the reference voltage Vref2 for the low remaining charge. In the example of FIG. 20, in the first charging cycle, the battery is forcibly charged from an external power supply before the battery remaining charge becomes 20%, therefore, there is no influence to the additional regeneration. In the second and third charging cycles, the charging is not performed until the battery remaining charge falls below 20%, however, the additional regeneration is performed in a state where the battery remaining charge falls below 20%. Therefore, compared with a case where the additional regeneration is not performed, a time until the battery remaining charge becomes 0% becomes long. Thus, it is possible to extend a running distance.

Figure 21:
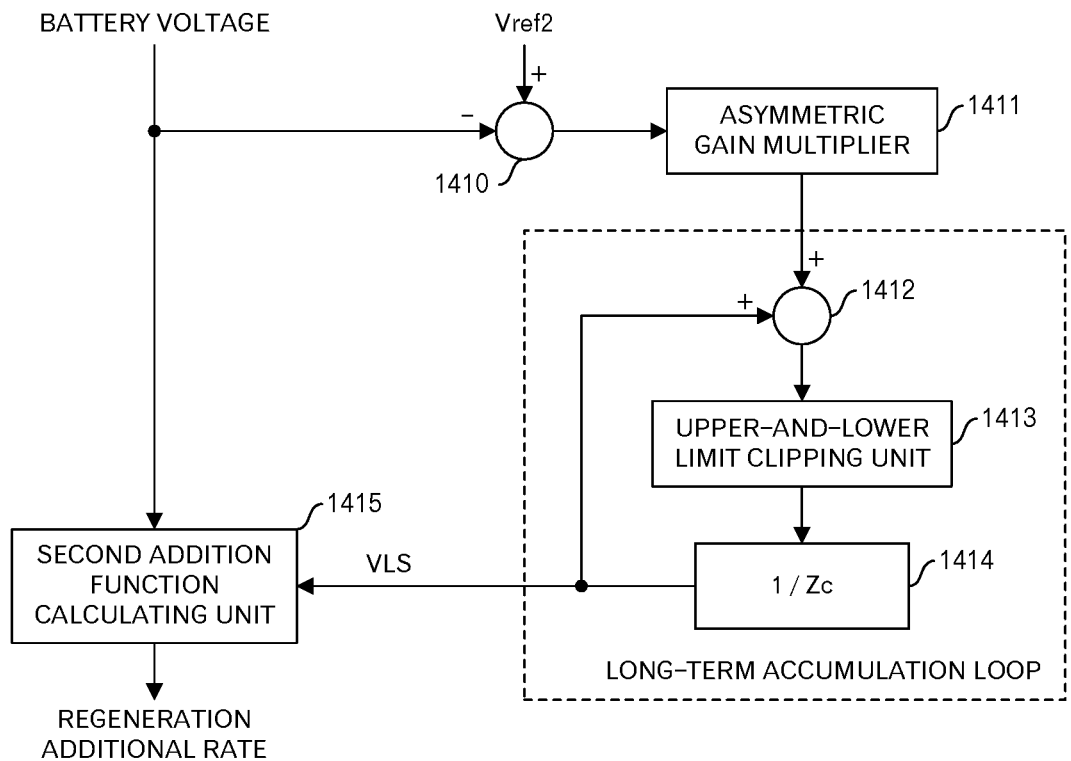
FIG. 21 is another functional block diagram of the additional regeneration control unit.

In addition, the additional regeneration control unit 1324 may have a configuration as illustrated in FIG. 21, for example.

The additional regeneration control unit 1324 has an adder 1410, an asymmetric gain multiplier 1411, an adder 1412, an upper-and-lower limit clipping unit 1413, a delay unit (1/Zc) 1414 and a second addition function calculating unit 1415.

The adder 1410 calculates (the reference voltage Vref2 for the low remaining charge—the battery voltage) for each time when the forcible charge from the external power supply is performed. The asymmetric gain multiplier 1411 asymmetrically multiplies a gain, for example, when the output of the adder 1410 is positive, 0.1 is multiplied, and the output of the adder 1410 is negative, 0.01 is multiplied. In other words, when (the reference voltage Vref2 for the low remaining charge—the battery voltage) is positive, the battery voltage is lower than the reference voltage Vref2 for the low remaining charge, and a shortage of the battery remaining charge has occurred. Therefore, a large gain is multiplied.

The adder 1412, the upper-and-lower limit clipping unit 1413 and the delay unit 1414 make a long-term accumulation loop, which is a loop to accumulate one sample for each time when the forcible charging is performed from the external power supply. The adder 1412 adds an accumulated correction value VLS that is an output of the delay unit 1414 and the output of the asymmetric gain multiplier 1411. The upper-and-lower limit clipping unit 1413 clips the output of the adder 1412 to a range from the upper limit 2V to the lower limit 0V, for example.

Figure 22:
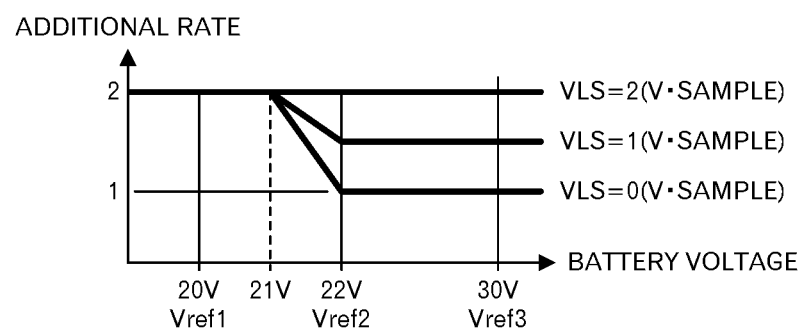
FIG. 22 is a diagram depicting an example of a second addition function.

The second addition function calculating unit 1415 calculates a value of the addition function as illustrated in FIG. 22 using, as inputs, the battery voltage and the accumulated correction value VLS. More specifically, additional rates as illustrated in FIG. 22 are calculated. In an example of FIG. 22, in case of VLS=0 (V*sample), a curve as illustrated in FIG. 19 is drawn, however, in case of VLS=1 (V*sample), a curve of VLS=1 (V*sample) in FIG. 22 is drawn. In other words, a curve is employed in which 1.5 is set as the regeneration additional rate when the battery voltage is Vref3 to Vref2, and when the battery voltage becomes equal to or less than Vref2, the regeneration additional rate linearly increases until the regeneration additional rate becomes "2" at the battery voltage=21V. Furthermore, in case of VLS=2 (V*sample), "2" is always set as the regeneration additional rate. Other values of VLS are obtained by the interpolation.

Figure 23:
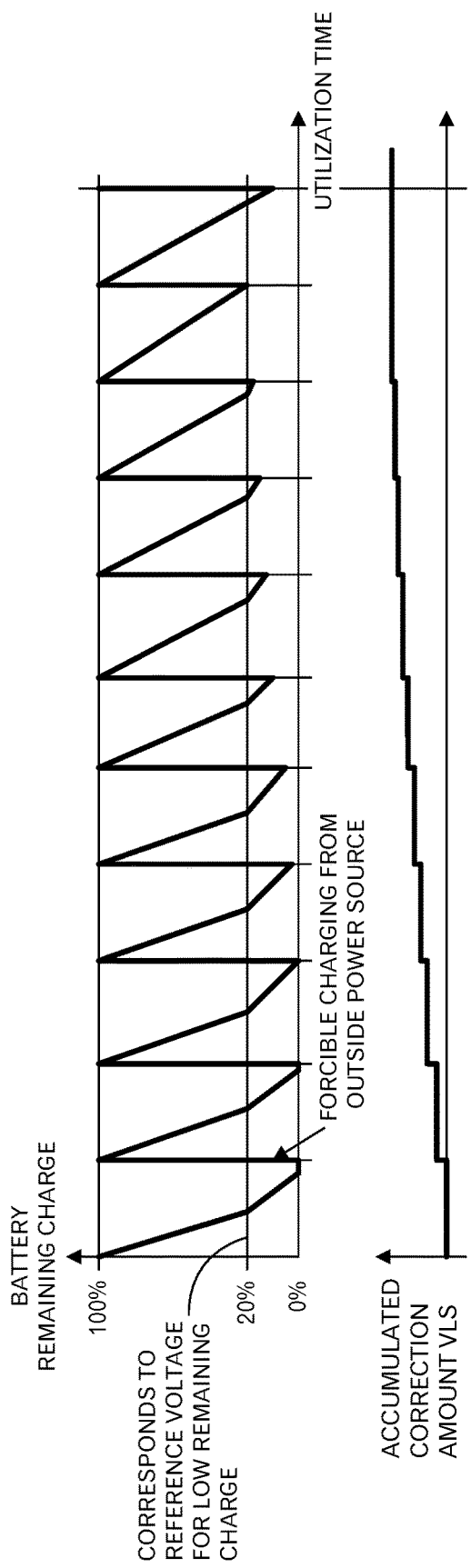
FIG. 23 is a diagram depicting an example of temporal change of battery remaining charge on the assumption of the second addition function in FIG. 22.

FIG. 23 illustrates an example of temporal change of the battery remaining charge in case where such a configuration is employed. In an example of FIG. 23, when an operation is repeated that the forcible charging from the external power supply is not performed until the battery remaining charge falls below the battery remaining charge 20%, which corresponds to the reference voltage for the low remaining charge, the accumulated correction value VLS gradually increases. Therefore, the regeneration additional rate increases early. Then, the decrease of the battery remaining charge diminishes and when the forcible charging from the external power supply is performed at similar intervals, the charging from the external power supply is performed when the battery remaining charge is about 20%.

By doing so, when VLS is great, in other words, when the forcible charging from the external power supply is not chronically performed in case of no additional regeneration, until the battery remaining charge diminishes, the regeneration additional rate is increased from a timing of the full charging, and the strength of the regeneration is increased. Therefore, the control is performed so that an average power consumption rate is initially suppressed and the shortage of the battery remaining charge hardly occurs.

In the aforementioned example, the regeneration additional rate is multiplied. However, a value corresponding to the regeneration additional rate may be added, or both of the addition and multiplication may be applied.

Although embodiments of this invention were explained above, these are mere examples. Therefore, it is possible to make various changes along the aforementioned points.

There are plural computation methods for realizing the aforementioned functions, and any of methods may be employed.

Moreover, a portion of the computing unit 1021 may be implemented by dedicated circuits or the aforementioned function may be implemented by executing program by a microprocessor.

Furthermore, the front-wheel vehicle speed Vf is merely used, because the vehicle speed measured by the front-wheel in the aforementioned example represents the vehicle speed, and another method may be used if the vehicle speed can be measured. In addition, in the above explanation, the pedal speed converted by the maximum gear ratio is used, however, there is a case where the bicycle has no gear. Therefore, in such a case, the pedal speed converted by the gear ratio "1" is used. Anyway, any method for calculating the pedal speed may be employed. Furthermore, in the above explanation, the coincidence degree is used, however, another value, which represents a relationship between the vehicle speed and the pedal-rotation converted speed may be used.

Figure 24:
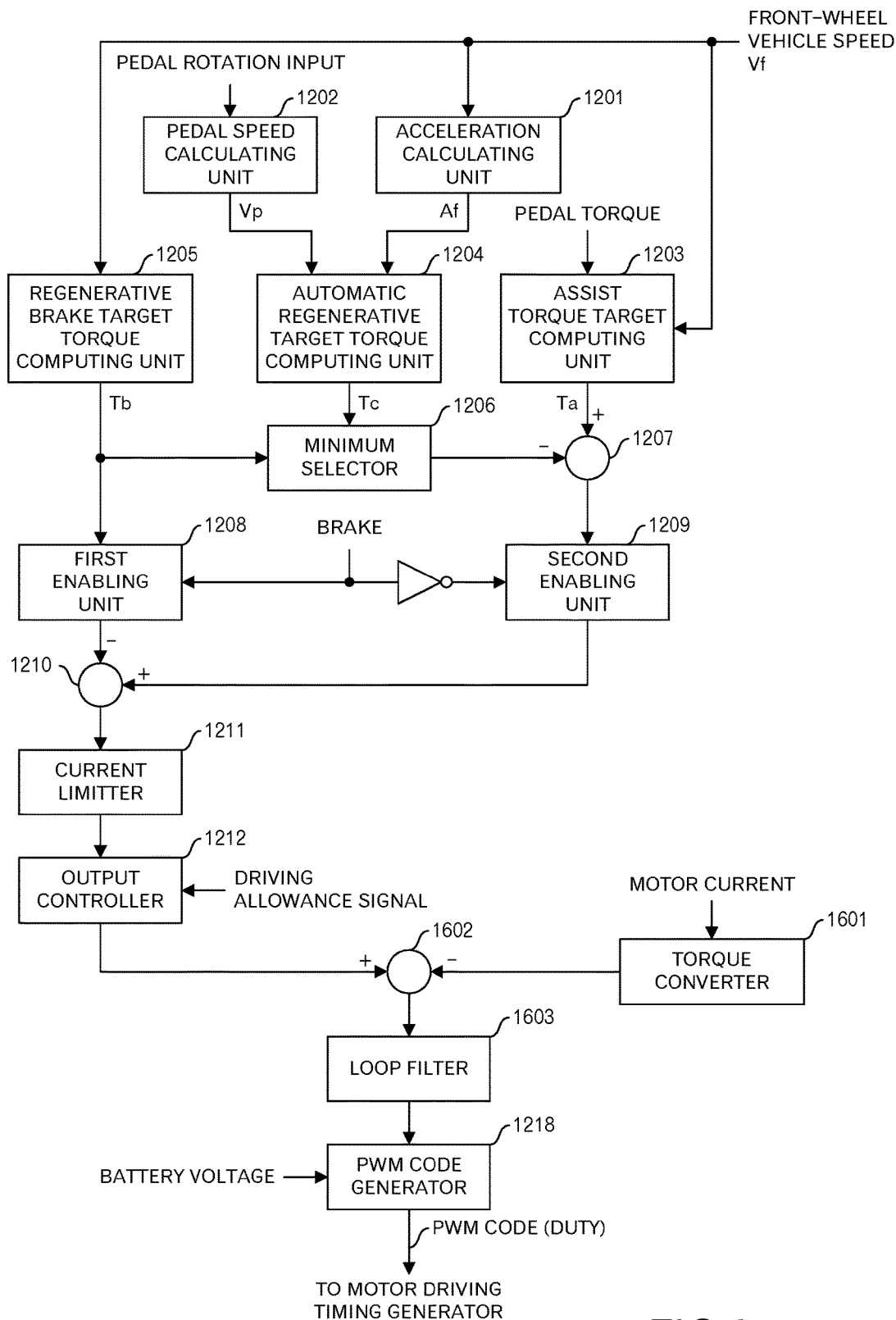
FIG. 24 is a diagram depicting a configuration example in case where the embodiment is applied to a current feedback type torque driving method.

Furthermore, in the aforementioned embodiments, a duty ratio corresponding to the front-wheel vehicle speed Vf and a duty ratio corresponding to the pedal torque and regenerative torque are added to output a PWM code to the motor driving timing generator 1026. However, as illustrated in FIG. 24, this invention can be applied to a current-feedback type torque driving method. In FIG. 24, the same reference numbers are attached to the same elements as those in FIG. 3. In other words, elements up to the output controller 1212 are identical. The output of the output controller 1212 is inputted into an adder 1602 together with a torque obtained by converting the motor current that flows, for example, in the FET bridge 1030 by a torque converter 1601, and the adder 1602 calculates a torque to be generated, from {(the output of the output controller 1212)−(the torque from the torque converter 1601)}. Then, the output of the adder 1602 is inputted and processed in a loop filter 1603 with a loop gain, which includes a gain for the torque servo and a response adjustment filter, and the PWM code generator 1218 generates a PWM code by multiplying the output of the loop filter 1603 by the reference voltage (e.g. 24V)/the battery voltage. The PWM code is outputted to the motor driving timing generator 1026.

DESCRIPTION OF SYMBOLS

105 motor
1030 FET bridge
1020 control device
106 operation panel
104 brake sensor
103 torque sensor
108 thermistor
107 pedal rotation sensor
101 secondary battery
1021 computing unit
1022 pedal rotation input unit
1023 temperature input unit
1024 vehicle speed input unit
1025 variable delay circuit
1026 motor driving timing generator
1027 torque input unit
1028 brake input unit
1029 AD input unit
10211 memory

The invention claimed is:

1. An electrically assisted vehicle, comprising:
a rechargeable battery;
an inverter configured to drive a motor to generate a certain regenerative braking force; and
a regeneration controller configured to determine a regenerative braking force according to a running state of the electrically assisted vehicle, to correct the regenerative braking force according to an accumulated value obtained by accumulating plural values, each of which represents a decreasing degree of remaining charge of the rechargeable battery, and to control the inverter to cause the motor to generate the corrected regenerative braking force.

2. The electrically assisted vehicle as set forth in claim 1, wherein the values are obtained at respective timings of charging the rechargeable battery by an external power supply.

3. The electrically assisted vehicle as set forth in claim 2, wherein the regeneration controller is configured to increase the regenerative braking force when the accumulated value is calculated using the values that are obtained while the decreasing degree of the remaining charge of the rechargeable battery at the timing is kept to be greater than a predetermined threshold.

4. The electrically assisted vehicle as set forth in claim 1, wherein the regeneration controller is configured to increase the regenerative braking force when the accumulated value is calculated using the values that represent shortage of the remaining charge of the rechargeable battery.

5. The electrically assisted vehicle as set forth in claim 1, wherein the regenerative controller is configured to determine each of the values based on an output voltage of the rechargeable battery.

6. The electrically assisted vehicle as set forth in claim 1, wherein the regenerative controller is configured to cause the inverter to perform a regenerative braking in response to a braking operation.

7. The electrically assisted vehicle as set forth in claim 1, wherein the regenerative controller is configured to cause the inverter to automatically perform a regenerating braking according to the running state of the electrically assisted vehicle.

8. The electrically assisted vehicle as set forth in claim 1, wherein the regenerative controller is configured to further correct the regenerative braking force so that the regenerative braking force increases according to decrease of the remaining charge of the rechargeable battery.

* * * * *